United States Patent
Bergh et al.

(10) Patent No.: US 10,078,252 B2
(45) Date of Patent: *Sep. 18, 2018

(54) ELECTROCHROMIC MULTI-LAYER DEVICES WITH COMPOSITE CURRENT MODULATING STRUCTURE

(71) Applicant: KINESTRAL TECHNOLOGIES, INC., South San Francisco, CA (US)

(72) Inventors: Howard S. Bergh, South San Francisco, CA (US); Jonathan Ziebarth, South San Francisco, CA (US); Nicolas Timmerman, South San Francisco, CA (US)

(73) Assignee: KINESTRAL TECHNOLOGIES, INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,018

(22) Filed: Mar. 15, 2017

(65) Prior Publication Data

US 2017/0184938 A1      Jun. 29, 2017

Related U.S. Application Data

(63) Continuation of application No. 14/750,480, filed on Jun. 25, 2015, now Pat. No. 9,606,410, which is a continuation of application No. 13/961,669, filed on Aug. 7, 2013, now Pat. No. 9,091,868.

(60) Provisional application No. 61/681,131, filed on Aug. 8, 2012.

(51) Int. Cl.
| G02F 1/15 | (2006.01) |
| G02F 1/00 | (2006.01) |
| G09G 3/19 | (2006.01) |
| G02F 1/153 | (2006.01) |
| G02F 1/155 | (2006.01) |
| G02F 1/163 | (2006.01) |

(52) U.S. Cl.
CPC ............ *G02F 1/1533* (2013.01); *G02F 1/155* (2013.01); *G02F 1/1523* (2013.01); *G02F 1/163* (2013.01)

(58) Field of Classification Search
CPC .... G02F 1/1523; G02F 1/1525; G02F 1/1521; G02F 1/1533; G02F 1/155; G02F 1/03; G02F 1/0316; G02F 3/16; G02F 1/163; C09K 9/02; B60R 1/088; H04N 9/3137; H04N 9/22
USPC ........ 359/265–275, 277, 245–247, 254, 242; 345/49, 105; 250/70; 438/929
See application file for complete search history.

(56) References Cited

U.S. PATENT DOCUMENTS

2012/0200908 A1* 8/2012 Bergh ............... G02F 1/155
                                                      359/275

* cited by examiner

*Primary Examiner* — Dawayne A Pinkney
(74) *Attorney, Agent, or Firm* — Womble Bond Dickinson (US) LLP

(57) ABSTRACT

A multi-layer device comprising a first substrate, a first electrically conductive layer and a first current modulating structure on a surface thereof, the first current modulating structure comprising a composite of a resistive material and a patterned insulating material, the first current modulating structure having a cross-layer resistance to the flow of electrical current through the first current modulating structure that varies as a function of position.

20 Claims, 25 Drawing Sheets

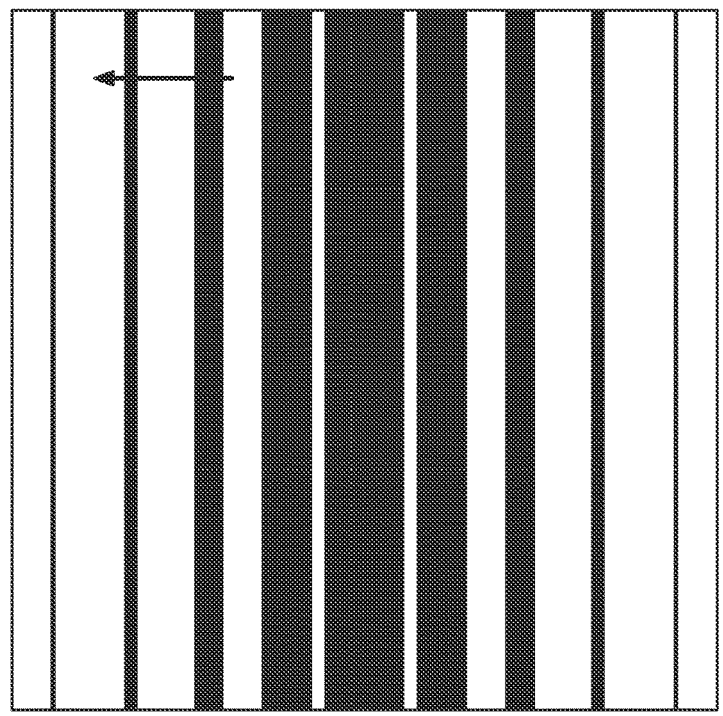
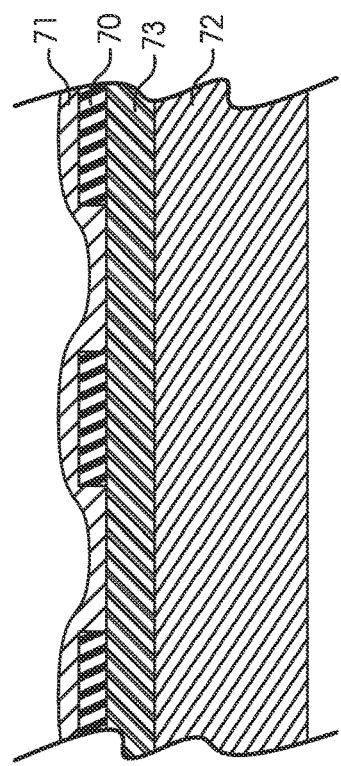
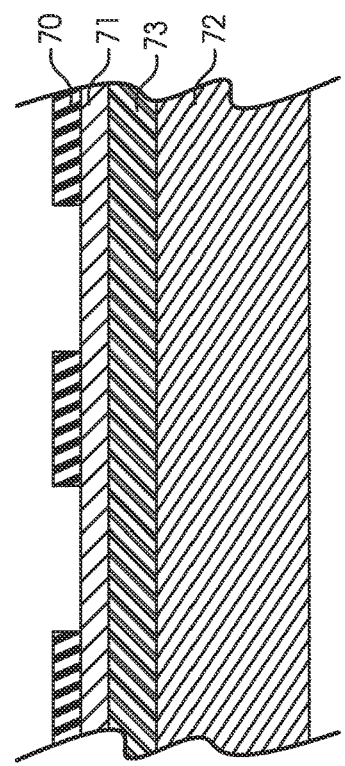

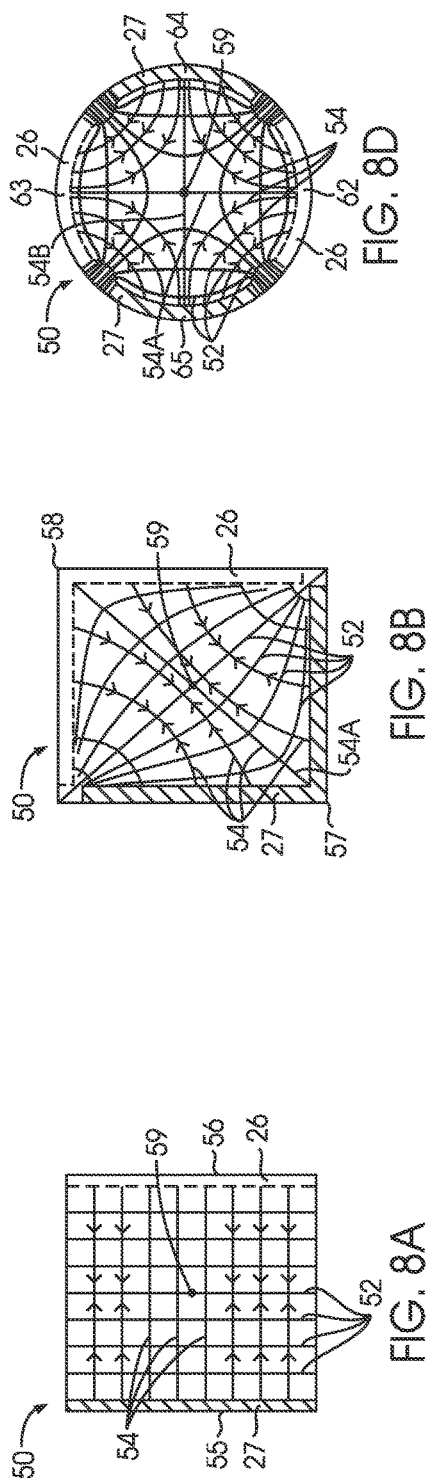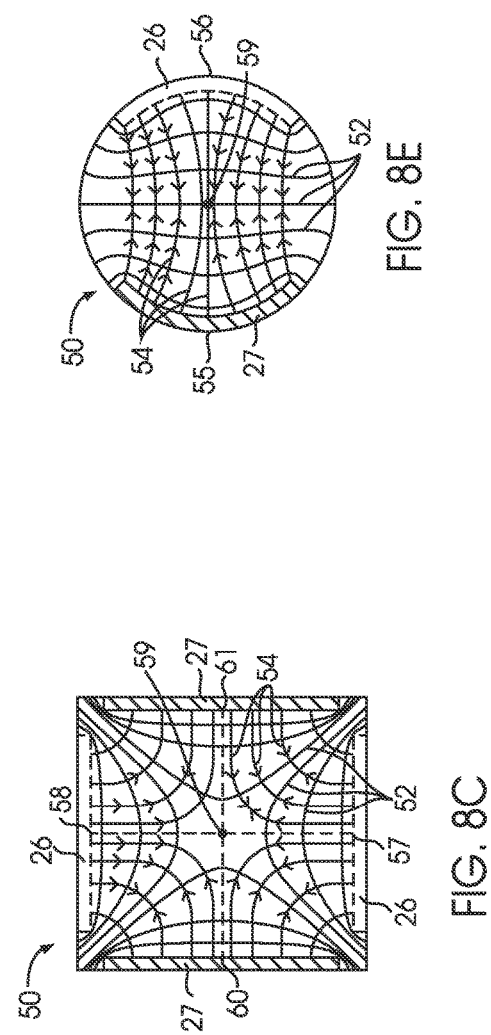

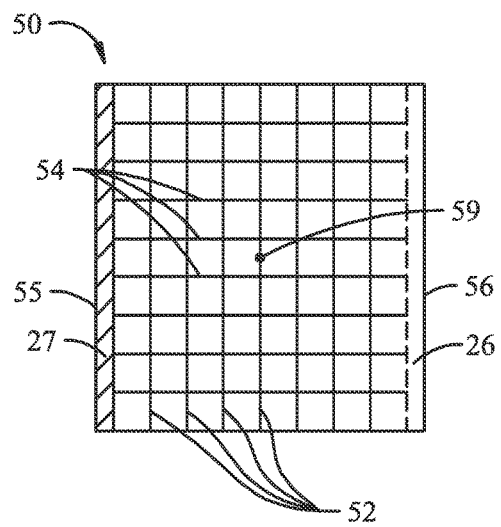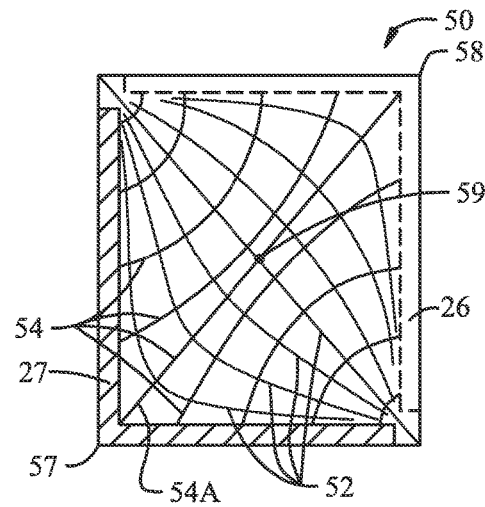
FIG. 10A  FIG. 10B
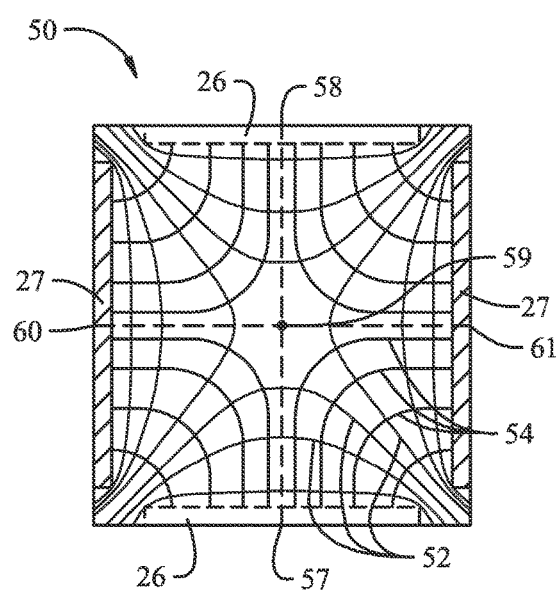
FIG. 10C

ELECTROCHROMIC MULTI-LAYER DEVICES WITH COMPOSITE CURRENT MODULATING STRUCTURE

FIELD OF THE INVENTION

The present invention generally relates to switchable electrochromic devices, such as architectural windows, capable of coordinated switching over substantially their entire area or a selected sub-region of their entire area. More particularly, and in one preferred embodiment, the present invention is directed to switchable electrochromic multi-layer devices, particularly large area rectangular windows for architectural applications that switch in a spatially coordinated manner over substantially their entire area or a selected sub-region of their entire area; optionally these are of non-uniform shape, optionally they switch synchronously, i.e., uniformly, over substantially their entire area or a selected sub-region of their entire area, or in a coordinated but nonsynchronous manner (e.g., from side-to-side, or top-to-bottom) from a first optical state, e.g., a transparent state, to a second optical state, e.g., a reflective or colored state.

BACKGROUND OF THE INVENTION

Commercial switchable glazing devices are well known for use as mirrors in motor vehicles, automotive windows, aircraft window assemblies, sunroofs, skylights, architectural windows. Such devices may comprise, for example, inorganic electrochromic devices, organic electrochromic devices, switchable mirrors, and hybrids of these having two conducting layers with one or more active layers between the conducting layers. When a voltage is applied across these conducting layers the optical properties of a layer or layers in between change. Such optical property changes are typically a modulation of the transmissivity of the visible or the solar sub-portion of the electromagnetic spectrum. For convenience, the two optical states will be referred to as a lightened state and a darkened state in the following discussion, but it should be understood that these are merely examples and relative terms (i.e., one of the two states is "lighter" or more transmissive than the other state) and that there could be a set of lightened and darkened states between the extremes that are attainable for a specific electrochromic device; for example, it is feasible to switch between intermediate lightened and darkened states in such a set.

Switching between a lightened and a darkened state in relatively small electrochromic devices such as an electrochromic rear-view mirror assembly is typically quick and uniform, whereas switching between the lightened and darkened state in a large area electrochromic device can be slow and spatially non-uniform. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device; as a result, there may be a significant difference between the transmissivity near the edge of the device and the transmissivity at the center of the device. Over time, however, the difference in applied voltage between the center and edge decreases and, as a result, the difference in transmissivity at the center and edge of the device decreases. In such circumstances, the electrochromic medium will typically display non-uniform transmissivity by initially changing the transmissivity of the device in the vicinity of the applied potential, with the transmissivity gradually and progressively changing towards the center of the device as the switching progresses. While the iris effect is most commonly observed in relatively large devices, it also can be present in smaller devices that have correspondingly higher resistivity conducting layers.

SUMMARY OF THE INVENTION

Among the various aspects of the present invention is the provision of relatively large-area electrochromic multi-layer devices capable of coordinated switching and coloring, across substantially its entire area that can be easily manufactured.

Briefly, therefore, the present invention is directed to a multi-layer device comprising a first substrate and a layered stack that is transmissive to electromagnetic radiation having a wavelength in the range of infrared to ultraviolet on a surface of the first substrate, the layered stack comprising a first electrically conductive layer and a first current modulating structure each covering at least 0.01 m$^2$ of the surface of the first substrate, the first electrically conductive layer being between the surface of the first substrate and the current modulating structure, the current modulating structure comprising a patterned layer.

Another aspect of the present invention is an electrochromic device comprising a first substrate, a first electrically conductive layer, a first current modulating structure, a first electrode layer, a second electrically conductive layer and a second substrate, the first substrate, the first electrically conductive layer and the first current modulating structure being transmissive to electromagnetic radiation having a wavelength in the range of infrared to ultraviolet, the first current modulating structure being a patterned structure having a non-uniform cross-layer resistance and between the first electrically conductive layer and the first electrode layer wherein a ratio of the average cross-layer resistance through a first region of the first current modulating structure circumscribed by a first convex polygon to the average cross-layer resistance through a second region of the first current modulating structure circumscribed by a second convex polygon is at least 1.25, the first and second regions circumscribed by the first and second convex polygons, respectively, each comprising at least 10% of the surface area of the first current modulating structure.

Another aspect of the present invention is a process for the preparation of a multi-layer device comprising forming a multi-layer layer structure comprising an electrochromic layer between and in electrical contact with a first and a second electrically conductive layer, and a first current modulating structure between the first electrically conductive layer and the electrochromic layer, the first electrically conductive layer and the first current modulating structure being transmissive to electromagnetic radiation having a wavelength in the range of infrared to ultraviolet, the first current modulating structure being a patterned structure having a non-uniform cross-layer resistance and between the first electrically conductive layer and the electrochromic layer wherein a ratio of the average cross-layer resistance through a first region of the first current modulating structure circumscribed by a first convex polygon to the average cross-layer resistance through a second region of the first current modulating structure circumscribed by a second convex polygon is at least 1.25, the first and second regions circumscribed by the first and second convex polygons, respectively, each comprising at least 10% of the surface area of the first current modulating structure.

Other objects and features will be in part apparent and in part pointed out hereinafter.

BRIEF DESCRIPTION OF THE DRAWINGS

FIGS. 5A and 5B are schematic cross-sections showing two embodiments of the present invention in which the cross-layer resistance of a current modulating structure is varied as a function of position by patterning a layer of resistive material with a layer of insulating material. FIG. 5C is an exemplary pattern of resistive and insulating material layers.

FIGS. 8A-8E show contour maps of the cross-layer resistance, $R_C$, in a current modulating structure of the present invention.

FIG. 10A-10E is a series of contour maps of the sheet resistance, $R_s$, in the first and/or second electrically conductive layer as a function of position (two-dimensional) within the first and/or second electrically conductive layer showing isoresistance lines (also sometimes referred to as contour lines) and resistance gradient lines (lines perpendicular to the isoresistance lines) resulting from various alternative arrangements of bus bars for devices having square and circular perimeters.

Figure 1:
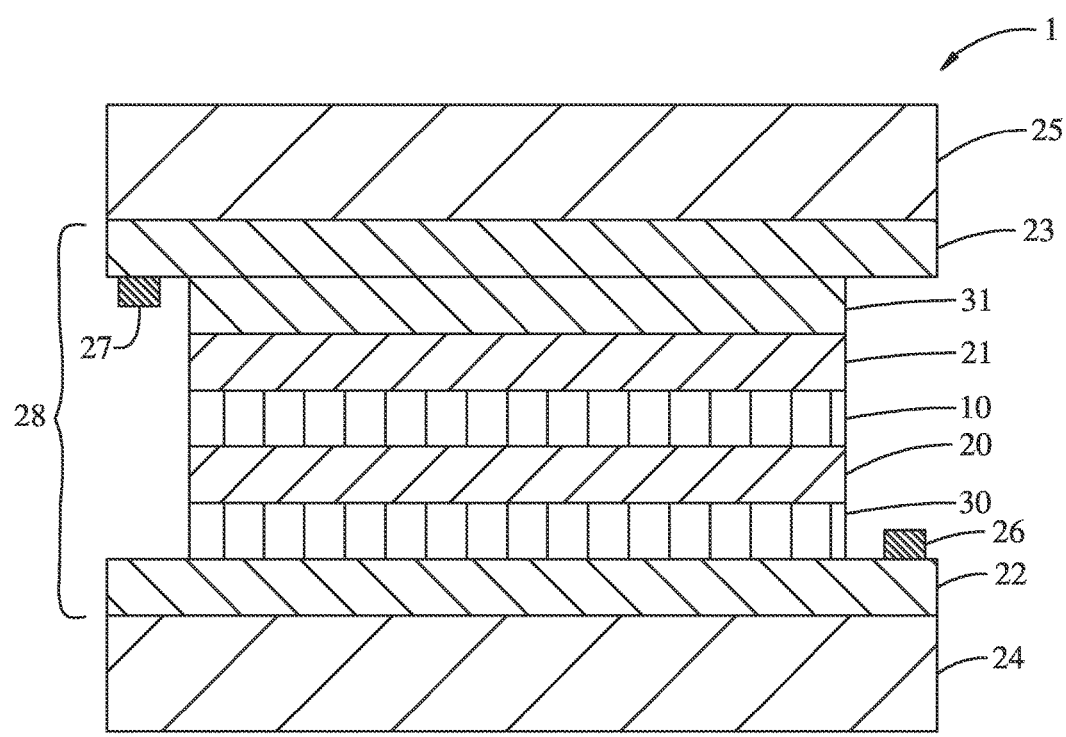
FIG. 1 is a schematic cross-section of a multi-layer electrochromic device of the present invention.
Figure 2A:
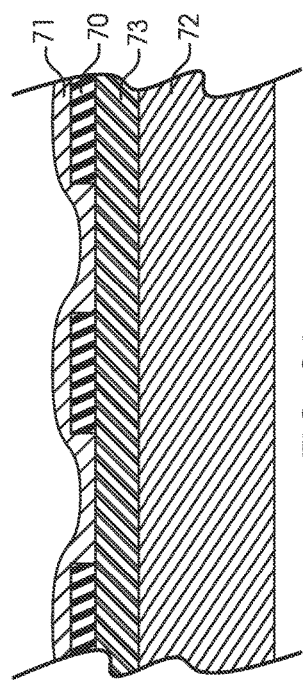
FIGS. 2A and 2B are schematic cross-sections showing two embodiments of the present invention in which the cross-layer resistance of a current modulating structure is varied as a function of position by patterning a layer of resistive material with a layer of insulating material.
Figure 2B:
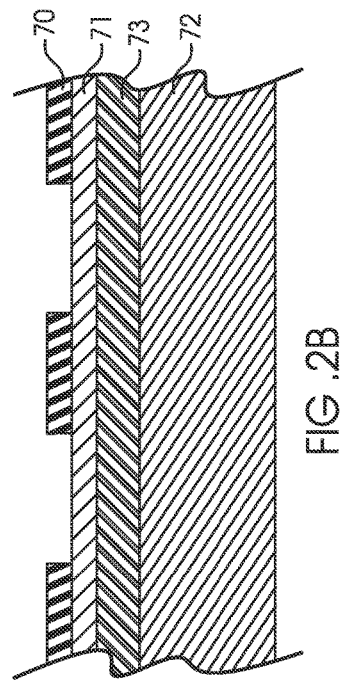
Figure 2C:
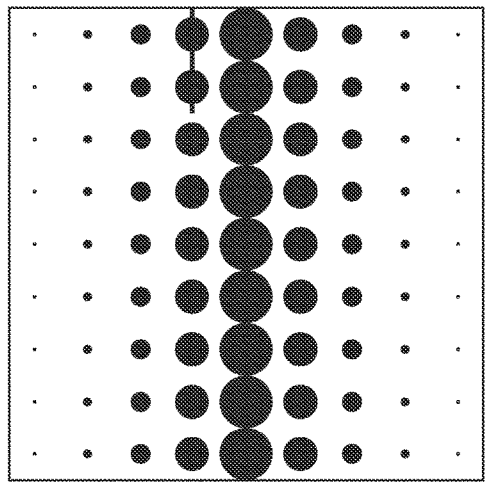
FIGS. 2C and 2D are corresponding exemplary patterns of resistive and insulating material layers.
Figure 2D:
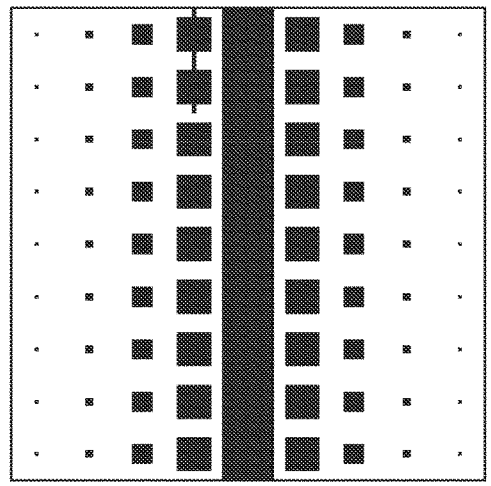
Figure 3A:
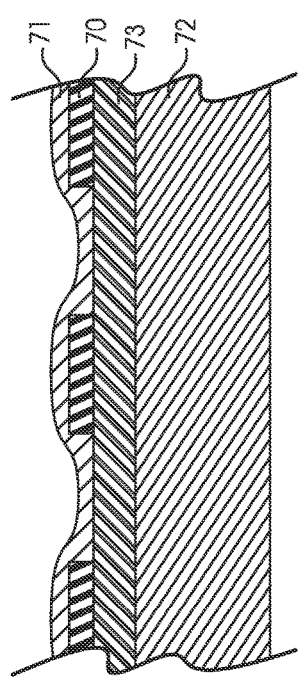
FIGS. 3A and 3B are schematic cross-sections showing two embodiments of the present invention in which the cross-layer resistance of a current modulating structure is varied as a function of position by patterning a layer of resistive material with a layer of insulating material.
Figure 3B:
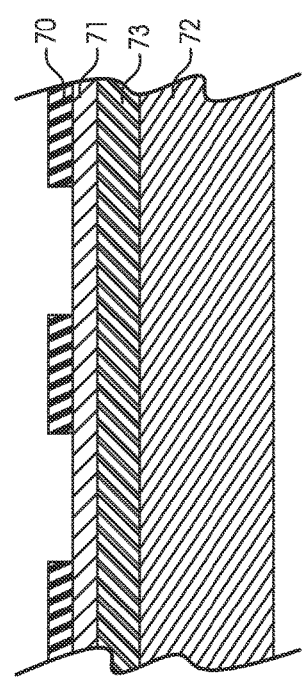
Figure 3C:
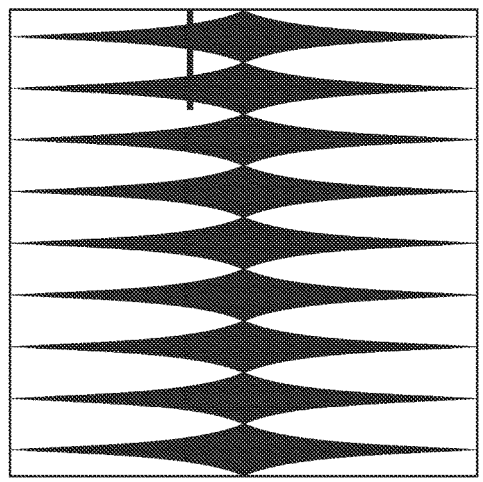
FIGS. 3C and 3D are corresponding exemplary patterns of resistive and insulating material layers.
Figure 3D:
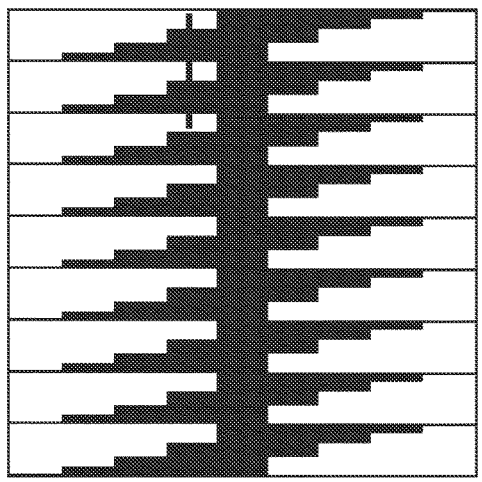

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The following definitions and methods are provided to better define the present invention and to guide those of ordinary skill in the art in the practice of the present invention. Unless otherwise noted, terms are to be understood according to conventional usage by those of ordinary skill in the relevant art.

The term "anodic electrochromic layer" refers to an electrode layer that changes from a more transmissive state to a less transmissive state upon the removal of ions.

The term "cathodic electrochromic layer" refers to an electrode layer that changes from a more transmissive state to a less transmissive state upon the insertion of ions.

The terms "conductive" and "resistive" refer to the electrical conductivity and electrical resistivity of a material.

The term "convex polygon" refer to a simple polygon in which every internal angle is less than or equal to 180 degrees, and every line segment between two vertices remains inside or on the boundary of the polygon. Exemplary convex polygons include triangles, rectangles, pentagons, hexagons, etc., in which every internal angle is less than or equal to 180 degrees and every line segment between two vertices remains inside or on the boundary of the polygon.

The term "cross-layer resistance" as used in connection with a layer (or an elongate structure) is the resistance to current flow substantially normal to a major surface of the layer (or the elongate structure).

The term "electrochromic layer" refers to a layer comprising an electrochromic material.

The term "electrochromic material" refers to materials that are able to change their optical properties, reversibly, as a result of the insertion or extraction of ions and electrons. For example, an electrochromic material may change between a colored, translucent state and a transparent state.

The term "electrode layer" refers to a layer capable of conducting ions as well as electrons. The electrode layer contains a species that can be oxidized when ions are inserted into the material and contains a species that can be reduced when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode stack.

The term "sheet resistance" as used in connection with a layer (or an elongate structure) is the resistance to current flow substantially parallel to a major surface of the layer (or the elongate structure).

The term "transmissive" is used to denote transmission of electromagnetic radiation through a material.

The term "transparent" is used to denote substantial transmission of electromagnetic radiation through a material such that, for example, bodies situated beyond or behind the material can be distinctly seen or imaged using appropriate image sensing technology.

DETAILED DESCRIPTION OF THE PREFERRED EMBODIMENTS

FIG. 1 depicts a cross-sectional structural diagram of electrochromic device 1 according to a first embodiment of the present invention. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second current modulating structures 30 and 31. First and second current modulating structures 30 and 31, in turn, are adjacent first and second electrically conductive layers 22 and 23, respectively, which are arranged against outer substrates 24, 25, respectively. Elements 22, 30, 20, 10, 21, 31 and 23 are collectively referred to as an electrochromic stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 10 may be changed by applying a voltage pulse to electrically conductive layers 22 and 23. The pulse causes electrons and ions to move between first and second electrode layers 20 and 21 and, as a result, electrochromic material in the first and/or second electrode layer(s) change(s) optical states, thereby switching electrochromic device 1 from a more transmissive state to a less transmissive state, or from a less transmissive state to a more transmissive state. In one embodiment, electrochromic device 1 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by electrochromic materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an electrochromic device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific electrochromic device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" refers to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

The materials making up electrochromic stack 28 may comprise organic or inorganic materials, and they may be solid or liquid. For example, in certain embodiments the electrochromic stack 28 comprises materials that are inorganic, solid (i.e., in the solid state), or both inorganic and solid. Inorganic materials have shown better reliability in architectural applications. Materials in the solid state can also offer the advantage of not having containment and leakage issues, as materials in the liquid state often do. It should be understood that any one or more of the layers in the stack may contain some amount of organic material, but in many implementations one or more of the layers contains little or no organic matter. The same can be said for liquids that may be present in one or more layers in small amounts. In certain other embodiments some or all of the materials making up electrochromic stack 28 are organic. Organic ion conductors can offer higher mobilities and thus potentially better device switching performance. Organic electrochromic layers can provide higher contrast ratios and more diverse color options. Each of the layers in the electrochromic device is discussed in detail, below. It should also be understood that solid state material may be deposited or otherwise formed by processes employing liquid components such as certain processes employing sol-gels or chemical vapor deposition.

Referring again to FIG. 1, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, including soda lime float glass. The glass may be tempered or untempered. In some embodiments of electrochromic device 1 with glass, e.g. soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

In one preferred embodiment of the invention, first substrate 24 and second substrate 25 are each float glass. In certain embodiments for architectural applications, this glass is at least 0.5 meters by 0.5 meters, and can be much larger, e.g., as large as about 3 meters by 4 meters. In such applications, this glass is typically at least about 2 mm thick and more commonly 4-6 mm thick.

Independent of application, the electrochromic devices of the present invention may have a wide range of sizes. In general, it is preferred that the electrochromic device comprise a substrate having a surface with a surface area of at least 0.01 meter$^2$. For example, in certain embodiments, the electrochromic device comprises a substrate having a surface with a surface area of at least 0.1 meter$^2$. By way of further example, in certain embodiments, the electrochromic device comprises a substrate having a surface with a surface area of at least 1 meter$^2$. By way of further example, in certain embodiments, the electrochromic device comprises a substrate having a surface with a surface area of at least 5 meter$^2$. By way of further example, in certain embodiments, the electrochromic device comprises a substrate having a surface with a surface area of at least 10 meter$^2$.

At least one of the two electrically conductive layers 22, 23 is also preferably transparent in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nano particles (e.g., rods, tubes, dots) conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 μm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 1, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electric connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5 Ω/□.

At least one of first and second current modulating structures 30,31 is also preferably transparent in order to reveal the electrochromic properties of the stack 28 to the surroundings. In one embodiment, first current modulating structure 30 and first electrically conductive layer 22 are transparent. In another embodiment, second current modulating structure 31 and second electrically conductive layer 23 are transparent. In another embodiment, first and second current modulating structures 30, 31 and first and second electrically conductive layers 22, 23 are each transparent.

To facilitate more rapid switching of electrochromic device 1 from a state of relatively greater transmittance to a state of relatively lesser transmittance, or vice versa, first current modulating structure 30, second current modulating structure 31 or both first and second current modulating structures 30 and 31 is/are a composite of two materials to provide the current modulating structure(s) with a non-uniform cross-layer resistance, $R_C$, to the flow of electrons through the current modulating structure(s) (i.e., in the case of first current modulating structures 30, the cross-layer resistance is measured in the direction from electrically conductive layer 22 to electrode layer 20 and in the case of first current modulating structures 31, the cross-layer resistance is measured in the direction from electrically conductive layer 23 to electrode layer 21; in each instance a direction that is normal to the direction of the sheet resistance of electrically conductive layers 23 and 23, respectively). In one embodiment only one of first and second current modulating structures 30, 31 has a non-uniform cross-layer resistance, $R_C$, to the flow of electrons through the layer. Alternatively, and more typically, first current modulating structure 30 and second current modulating structure 31 each have a non-uniform cross-layer resistance, $R_C$, to the flow of electrons through the respective layers. Without being bound by any particular theory, it is presently believed that spatially varying the cross-layer resistance, $R_C$, of first current modulating structure 30 and second current modulating structure 31, spatially varying the cross-layer resistance, $R_C$, of the first current modulating structure 30, or spatially varying the cross-layer resistance, $R_C$, of the second current modulating structure 31 improves the switching performance of the device by providing a more uniform potential drop or a desired non-uniform potential drop across the device, over the area of the device.

In one exemplary embodiment, current modulating structure 30 and/or 31 is a composite comprising at least two materials possessing different conductivities. For example, in one embodiment the first material is a resistive material having a resistivity in the range of about $10^4$ Ω·cm to $10^{10}$ Ω·cm and the second material is an insulator. By way of further example, in one embodiment the first material is a resistive material having a resistivity of at least $10^4$ Ω·cm and the second material has a resistivity that exceeds the resistivity of the first by a factor of at least $10^2$. By way of further example, in one embodiment the first material is a resistive material having a resistivity of at least $10^4$ Ω·cm and the second material has a resistivity that exceeds the resistivity of the first by a factor of at least $10^3$. By way of further example, in one embodiment the first material is a resistive material having a resistivity of at least $10^4$ Ω·cm and the second material has a resistivity that exceeds the resistivity of the first by a factor of at least $10^4$. By way of further example, in one embodiment the first material is a resistive material having a resistivity of at least $10^4$ Ω·cm and the second material has a resistivity that exceeds the resistivity of the first by a factor of at least $10^5$. By way of further example, in one embodiment, at least one of current modulating structures 30, 31 comprises a first material having a resistivity in the range of $10^4$ to $10^{10}$ Ω·cm and a second material that is an insulator or has a resistivity in the range of $10^{10}$ to $10^{14}$ Ω·cm. By way of further example, in one embodiment, at least one of current modulating structures 30, 31 comprises a first material having a resistivity in the range of $10^4$ to $10^{10}$ Ω·cm and a second material having a resistivity in the range of $10^{10}$ to $10^{14}$ Ω·cm wherein the resistivities of the first and second materials differ by a factor of at least $10^3$. By way of further example, in one embodiment, at least one of current modulating structures 30, 31 comprises a first material having a resistivity in the range of $10^4$ to $10^{10}$ Ω·cm and a second material having a resistivity in the range of $10^{10}$ to $10^{14}$ Ω·cm wherein the resistivities of the first and second materials differ by a factor of at least $10^4$. By way of further example, in one embodiment, at least one of current modulating structures 30, 31 comprises a first material having a resistivity in the range of $10^4$ to $10^{10}$ Ω·cm and a second material having a resistivity in the range of $10^{10}$ to $10^{14}$ Ω·cm wherein the resistivities of the first and second materials differ by a factor of at least $10^5$. In each of the foregoing exemplary embodiments, each of current modulating structures 30, 31 may comprise a first material having a resistivity in the range of $10^4$ to $10^{10}$ Ω·cm and a second, material that is insulating.

Depending upon the application, the relative proportions of the first and second materials in current modulating structure 30 and/or 31 may vary substantially. In general, however, the second material (i.e., the insulating material or material having a resistivity in the range of $10^{10}$ to $10^{14}$ Ω·cm) constitutes at least about 5 vol % of at least one of current modulating structures 30, 31. For example, in one embodiment the second material constitutes at least about 10 vol % of at least one of current modulating structures 30, 31. By way of further example, in one embodiment the second material constitutes at least about 20 vol % of at least one of current modulating structures 30, 31. By way of further example, in one embodiment the second material constitutes at least about 30 vol % of at least one of current modulating structures 30, 31. By way of further example, in one embodiment the second material constitutes at least about 40 vol % of at least one of current modulating structures 30, 31. In general, however, the second material will typically not constitute more than about 70 vol % of either of current modulating structures 30, 31. In each of the foregoing embodiments and as previously discussed, the second material may have a resistivity in the range of $10^{10}$ to $10^{14}$ Ω·cm and the resistivities of the first and second materials (in either or both of current modulating structures 30, 31) may differ by a factor of at least $10^3$.

In general, first and second current modulating structures 30, 31 may comprise any material exhibiting sufficient resistivity, optical transparency, and chemical stability for the intended application. For example, in some embodiments, current modulating structures 30,31 may comprise a resistive or insulating material with high chemical stability. Exemplary insulator materials include alumina, silica, porous silica, fluorine doped silica, carbon doped silica, silicon nitride, silicon oxynitride, hafnia, magnesium fluoride, magnesium oxide, poly(methyl methacrylate) (PMMA), polyimides, polymeric dielectrics such as polytetrafluoroethylene (PTFE) and silicones. Exemplary resistive materials include zinc oxide, zinc sulfide, titanium oxide, and gallium (III) oxide, yttrium oxide, zirconium oxide, aluminum oxide, indium oxide, stannic oxide and germanium oxide. In one embodiment, one or both of first and second current modulating structures 30, 31 comprise one or more of such resistive materials. In another embodiment, one or both of first and second current modulating structures 30, 31 comprise one or more of such insulating materials. In another embodiment, one or both of first and second current modulating structures 30, 31 comprise one or more of such resistive materials and one or more of such insulating materials.

The thickness of current modulating structures 30, 31 may be influenced by the composition of the material comprised by the structures and its resistivity and transmissivity. In some embodiments, current modulating structures 30 and 31 are transparent and each have a thickness that is between about 50 nm and about 1 micrometer. In some embodiments, the thickness of current modulating structures 30 and 31 is between about 100 nm and about 500 nm. In general, thicker or thinner layers may be employed so long as they provide the necessary electrical properties (e.g., conductivity) and optical properties (e.g., transmittance). For certain applications it will generally be preferred that current modulating structures 30 and 31 be as thin as possible to increase transparency and to reduce cost.

In general, electrical circuit modeling may be used to determine the cross-layer resistance distribution of the current modulating structures to provide desired switching performance, taking into account the type of electrochromic device, the device shape and dimensions, electrode characteristics, and the placement of electrical connections (e.g., bus bars) to the voltage source. The cross-layer resistance distribution, in turn, can be controlled, at least in part, by patterning the first and/or materials in the current modulating structure. In one embodiment, for example, the current modulating structure comprises a patterned layer of an insulating material and a layer of a resistive material. By way of further example, in one embodiment the current modulating structure is on the surface of an electrically conductive layer and comprises a layer of a first material that is resistive and a patterned layer of a second material that is insulating with the layer of the resistive first material being proximate the electrically conductive layer and the patterned layer of the insulating material being distal to the electrically conductive layer. By way of further example, in one embodiment the current modulating structure is on the surface of an electrically conductive layer and comprises a layer of a first material that is resistive and a patterned layer of a second material that is insulating with the patterned layer of the insulating material being proximate the electrically conductive layer and the layer of the first resistive material being distal to the electrically conductive layer.

The cross-layer resistance of the current modulating structure may be varied as a function of position by a range of techniques. FIGS. 2-7 illustrate various embodiments in which the cross-layer resistance of a current modulating structure may be varied as a function of position by patterning a layer of a resistive material with a layer of insulating material.

FIG. 2 illustrates two exemplary patterns (right column) that may be achieved by patterning a layer of a first material 71 and a second material 70 having a resistivity at least two orders of magnitude greater than the first material on a transparent conductive oxide (TCO) layer 73 supported by a substrate 72. In each of these embodiments, the second material 70 is deposited on the TCO layer 73 or the first material 71 in a predetermined pattern and the first material (i) overcoats the TCO but not the second material or (ii) overcoats the second material and fills the gaps between regions of the second material deposited on the TCO. In the top right panel of FIG. 2, circular regions of resistive but not insulating material and in the bottom right panel of FIG. 2 rectangular regions containing resistive but not insulating material increase in size relative to a background of insulating material as a function of distance from two opposing edges and reach a maximum size at the midline (or midpoint) between the bus bars of a multi-layer device (not shown) comprising the current modulating structure.

FIG. 3 illustrates two exemplary patterns (right column) that may be achieved by patterning a layer of a first material 71 and a second material 70 having a resistivity at least two orders of magnitude greater than the first material on a transparent conductive oxide (TCO) layer 73 supported by a substrate 72. In each of these embodiments, the second material 70 is deposited on the TCO layer 73 or the first material 71 in a predetermined pattern and the first material (i) overcoats the TCO but not the second material or (ii) overcoats the second material and fills the gaps between regions of the second material deposited on the TCO. In the top right panel of FIG. 3, "diamond-shaped" regions (top right panel) containing resistive but not insulating material and "stair-stepped" regions of resistive material (bottom right panel) (bottom right panel) containing resistive but not insulating material increase in size relative to a background of insulating material as a function of distance from two opposing edges and reach a maximum size at the midline (or midpoint) between the bus bars of a multi-layer device (not shown) comprising the current modulating structure.

Figure 4C:
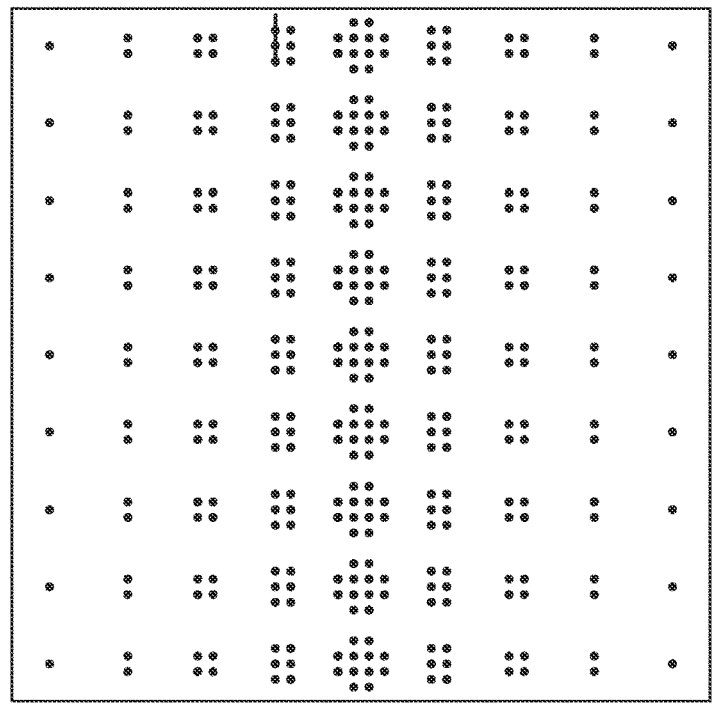
FIG. 4C is an exemplary pattern of resistive and insulating material layers.
Figure 4A:
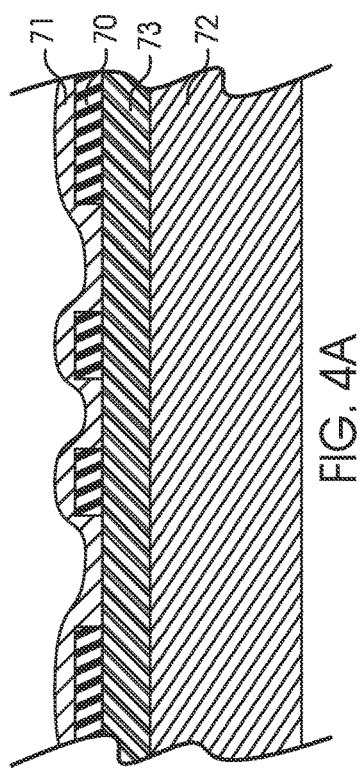
FIGS. 4A and 4B are schematic cross-sections showing two embodiments of the present invention in which the cross-layer resistance of a current modulating structure is varied as a function of position by patterning a layer of resistive material with a layer of insulating material.
Figure 4B:
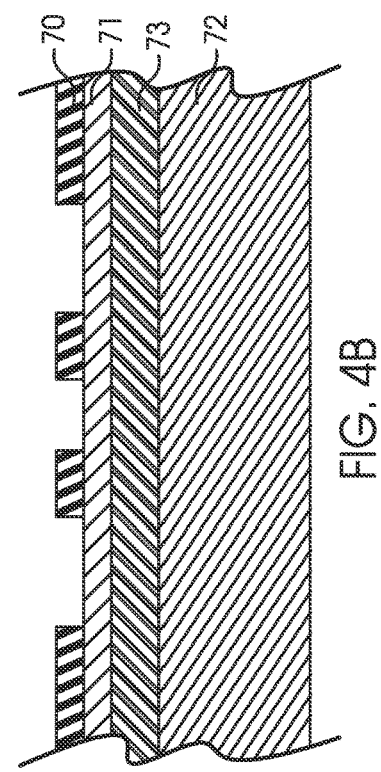

FIG. 4 illustrates an exemplary pattern that may be achieved by patterning a layer of a first material 71 and a second material 70 having a resistivity at least two orders of magnitude greater than the first material on a transparent conductive oxide (TCO) layer 73 supported by a substrate 72. In this embodiment, the second material 70 is deposited on the TCO layer 73 or the first material 71 in a predetermined pattern and the first material (i) overcoats the TCO but not the second material or (ii) overcoats the second material and fills the gaps between regions of the second material deposited on the TCO. In the right hand panel of FIG. 4, populations of circles of resistive material increase in number density (but not necessarily size) relative to a background of insulating material as a function of distance from two opposing edges and reach a maximum population density at the midline (or midpoint) between the bus bars of a multi-layer device (not shown) comprising the current modulating structure.

FIG. 5 illustrates an exemplary pattern that may be achieved by patterning a layer of a first material 71 and a second material 70 having a resistivity at least two orders of magnitude greater than the first material on a transparent conductive oxide (TCO) layer 73 supported by a substrate 72. In this embodiment, the second material 70 is deposited on the TCO layer 73 or the first material 71 in a predetermined pattern and the first material (i) overcoats the TCO but not the second material or (ii) overcoats the second material and fills the gaps between regions of the second material deposited on the TCO. In the right hand panel of FIG. 5 a series of lines of resistive material increase in width relative to a background of insulating material as a function of distance from two opposing edges and reach a maximum width at the midline (or midpoint) between the bus bars of a multi-layer device (not shown) comprising the current modulating structure.

Figure 6C:
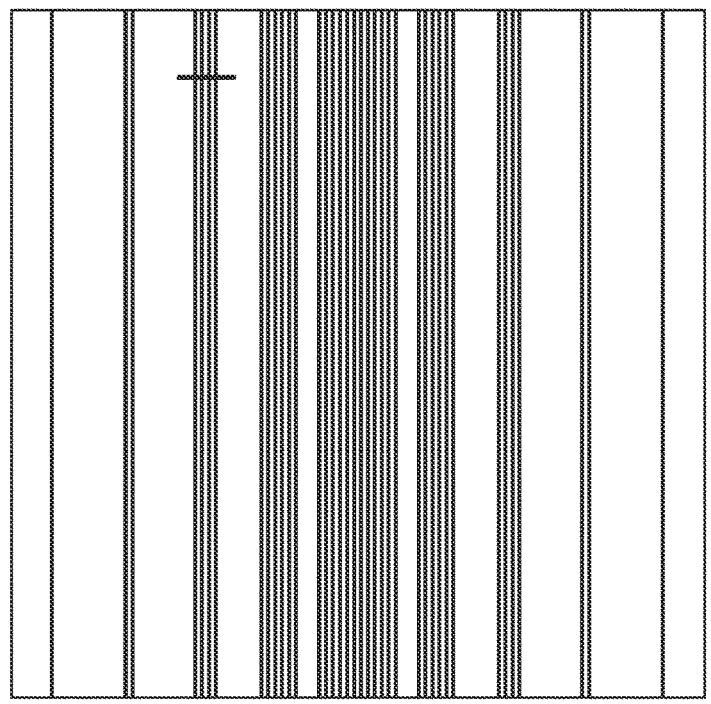
FIG. 6C is an exemplary pattern of resistive and insulating material layers.
Figure 6A:
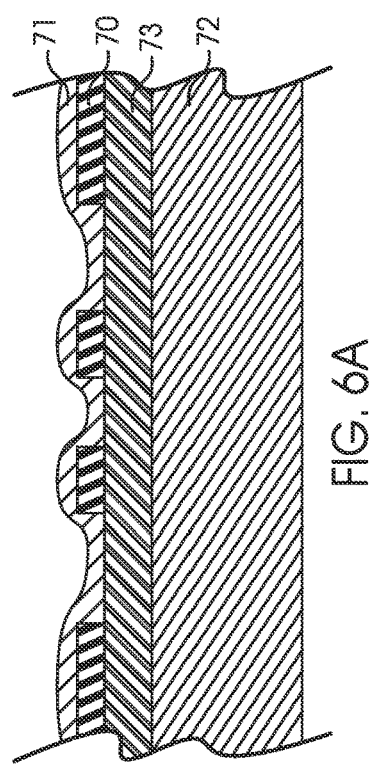
FIGS. 6A and 6B are schematic cross-sections showing two embodiments of the present invention in which the cross-layer resistance of a current modulating structure is varied as a function of position by patterning a layer of resistive material with a layer of insulating material.
Figure 6B:
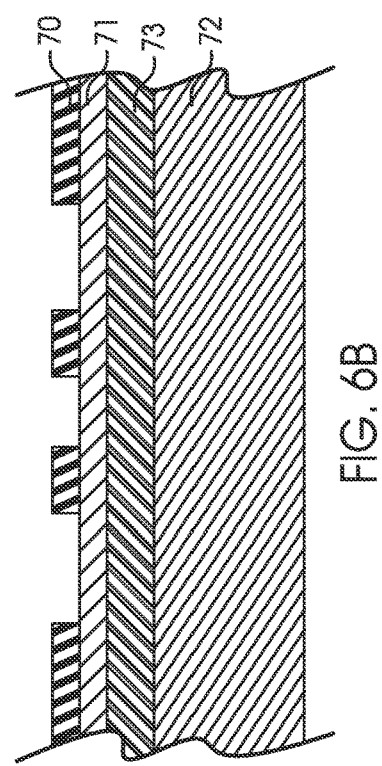

FIG. 6 illustrates an exemplary pattern that may be achieved by patterning a layer of a first material 71 and a second material 70 having a resistivity at least two orders of magnitude greater than the first material on a transparent conductive oxide (TCO) layer 73 supported by a substrate 72. In this embodiment, the second material 70 is deposited on the TCO layer 73 or the first material 71 in a predetermined pattern and the first material (i) overcoats the TCO but not the second material or (ii) overcoats the second material and fills the gaps between regions of the second material deposited on the TCO.

In the right hand panel of FIG. 6, populations of lines of resistive material increase in number density (but not necessarily size) relative to a background of insulating material as a function of distance from two opposing edges and reach a maximum population density at the midline (or midpoint) between the bus bars of a multi-layer device (not shown) comprising the current modulating structure.

Figure 7A:
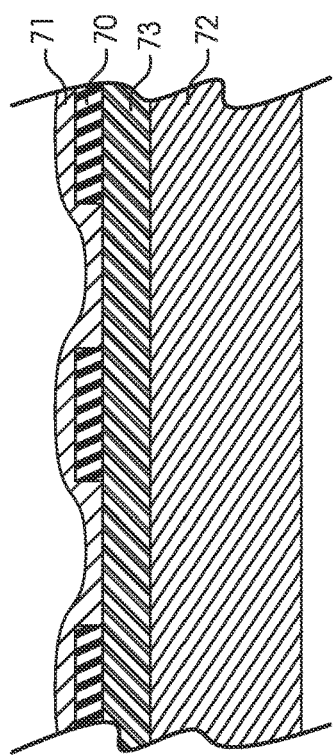
FIGS. 7A and 7B are schematic cross-sections showing two embodiments of the present invention in which the cross-layer resistance of a current modulating structure is varied as a function of position by patterning a layer of resistive material with a layer of insulating material.
Figure 7B:
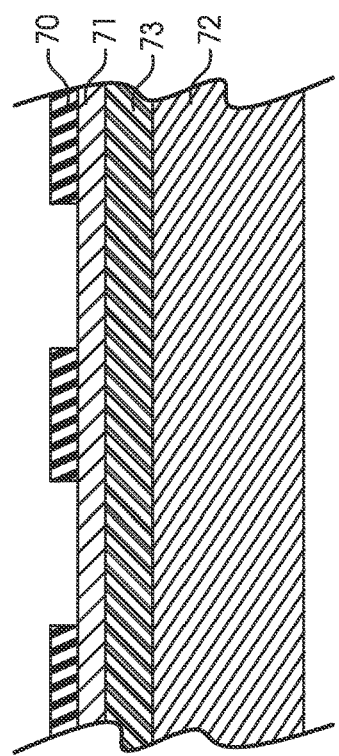
Figure 7C:
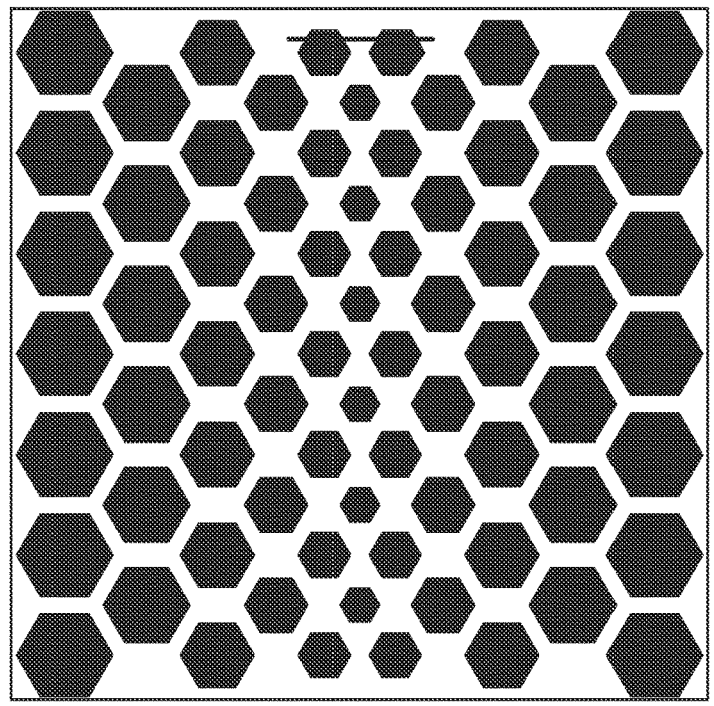
FIG. 7C is an exemplary pattern of resistive and insulating material layers.

FIG. 7 illustrates an exemplary pattern that may be achieved by patterning a layer of a first material 71 and a second material 70 having a resistivity at least two orders of magnitude greater than the first material on a Transparent conductive oxide (TCO) layer 73 supported by a substrate 72. In this embodiment, the second material 70 is deposited on the TCO layer 73 or the first material 71 in a predetermined pattern and the first material (i) overcoats the TCO but not the second material or (ii) overcoats the second material and fills the gaps between regions of the second material deposited on the TCO. In the right hand panel of FIG. 7 hexagon-shaped deposits of resistive material decrease in size relative to a background of insulating material as a function of distance from two opposing edges and reach a minimum size at the midline (or midpoint) between the bus bars of a multi-layer device (not shown) comprising the current modulating structure.

In each of the embodiments illustrated in FIGS. 2-7, the fraction of insulating material per unit area decreases as a function of distance from the opposing top and bottom edges and reaches a minimum at the midline (or midpoint) between the bus bars of a multi-layer device (not shown) comprising the current modulating structure where the fraction of insulating material in an area is at a minimum.

In general, the cross-layer resistance $R_C$, in the first current modulating structure 30, in the second current modulating structure 31, or in the first current modulating structure 30 and the second current modulating structure 31 may be plotted to join points of equal cross-layer resistance $R_C$, (i.e., isoresistance lines) as a function of (two-dimensional) position within the first and/or second current modulating structure. Plots of this general nature, sometimes referred to as contour maps, are routinely used in cartography to join points of equal elevation. In the context of the present invention, a contour map of the cross-layer resistance $R_C$, in the first and/or second current modulating structure as a function of (two-dimensional) position within the first and/or second current modulating structure preferably contains a series of isoresistance lines (also sometimes referred to as contour lines) and resistance gradient lines (lines perpendicular to the isoresistance lines). The cross-layer resistance $R_C$, along a gradient line in the first and/or second electrically conductive layer(s) generally increase(s), generally decrease(s), generally increase(s) until it reaches a maximum and then generally decrease(s), or generally decrease(s) until it reaches a minimum and then generally increase(s). In one such embodiment, the cross-layer resistance $R_C$, along a gradient line in the first and/or second electrically conductive layer(s) generally increase(s) parabolically, generally decrease(s) parabolically, generally increase(s) parabolically until it reaches a maximum and then generally decrease(s) parabolically, or generally decrease(s) parabolically until it reaches a minimum and then generally increase(s) parabolically.

FIGS. 8A-E depict a contour map of the cross-layer resistance, $R_C$, in a current modulating structure (i.e., the first current modulating structure, the second current modulating structure, or each of the first and second current modulating structures as a function of (two-dimensional) position within the current modulating structure for several exemplary embodiments of an electrochromic stack in accordance with the present invention. In each of FIGS. 8A-E, contour map 50 depicts a set of cross-layer resistance, $R_C$, curves 52 (i.e., curves along which the cross-layer resistance, $R_C$, has a constant value) and a set of resistance gradient curves 54 that are perpendicular to isoresistance curves 52 resulting from an electrochromic stack having a perimeter that is square (FIGS. 8A, 8B, and 8C) or circular (FIGS. 8D and 8E) and varying numbers and locations of bus bars 26 and 27 in contact with the first and second electrically conductive layers (not labeled) of the electrochromic stack. In FIG. 8A, the direction of the set of gradients 54 indicates that the cross-layer resistance, $R_C$, through the current modulating structure progressively increases along the set of gradients 54 and between west side 55 and east side 56 of the current modulating structure in contact with bus bar 27. In FIG. 8B, the direction of gradient 54A indicates that the cross-layer resistance, $R_C$, through the current modulating structure in contact with bus bar 27 progressively decreases from southwest corner 57 to centroid 59 and then decreases from centroid 59 to northeast corner 58. In FIG. 8C, the direction of the set of gradients 54 indicate that the cross-layer resistance, $R_C$, through the current modulating structure in contact with bus bar 27 progressively decreases from the west side 60 and east side 61 to centroid 59 and progressively increases from the top side 58 and bottom side 57 to centroid 59; stated differently, the cross-layer resistance, $R_C$, through the current modulating structure forms a saddle like form centered around centroid 59. In FIG. 8D, the direction of gradients 54a and 54b indicates that the cross-layer resistance, $R_C$, through the current modulating structure in contact with bus bar 27 progressively decreases from each of positions 64 and 65 to centroid 59 and progressively increases from each of positions 63 and 62 to centroid 59; stated differently, the cross-layer resistance, $R_C$, through the current modulating structure forms a saddle like form centered around centroid 59. In FIG. 8E, the direction of the set of gradients 54 indicates that the cross-layer resistance, $R_C$, through the current modulating structure in contact with bus bar 27 progressively decreases from the west side 55 to the east side 56. In one embodiment, for example, the cross-layer resistance, $R_C$, through the current modulating is a constant. By way of further example, in one embodiment, the gradient in the cross-layer resistance, $R_C$, through the current modulating structure is a constant and the substrate is rectangular in shape.

Figure 9:
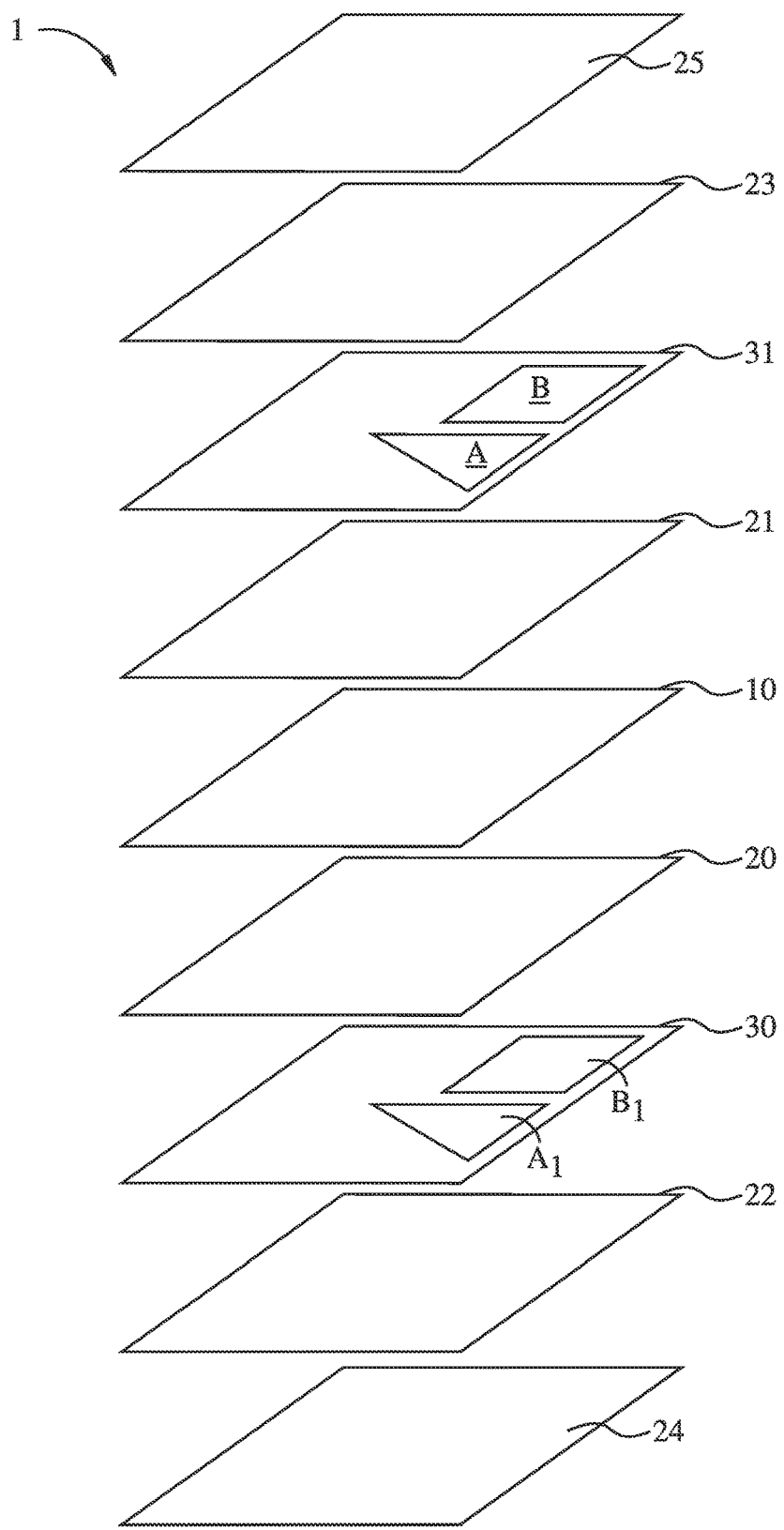
FIG. 9 is an exploded view of the multi-layer device of FIG. 1.

In one embodiment, the non-uniformity in the cross-layer resistance $R_C$ of the first current modulating structure may be observed by comparing the ratio of the average cross-layer resistance, $R_{C\text{-}avg}$ through two different regions of the first current modulating structure wherein the first and second regions are each circumscribed by a convex polygon and each comprises at least 10% of the surface area of the first current modulating structure. For example, in one such embodiment, the ratio of the average cross-layer resistance through a first region of the first current modulating structure, $R^1_{C\text{-}avg}$, to the average cross-layer resistance through a second region of the first current modulating structure, $R^2_{C\text{-}avg}$, is at least 1.25 wherein each of the first and second regions is circumscribed by a convex polygon, and each comprises at least 10% of the surface area of the first current modulating structure. This may be illustrated by reference to FIG. 9. First current modulating structure 30 comprises convex polygon $A_1$ and convex polygon $B_1$ and each circumscribes a region comprising at least 10% of the surface area of first current modulating structure 30; in one embodiment, the ratio of the average cross-layer resistance, $R^1_{C\text{-}avg}$, through a first region of the first current modulating structure bounded by convex polygon $A_1$ to the average cross-layer resistance, $R^2_{C\text{-}avg}$, through a second region of the first current modulating structure bounded by convex polygon $B_1$ is at least 1.25. As illustrated, convex polygon $A_1$ is a triangle and convex polygon $B_1$ is a square merely for purposes of exemplification; in practice, the first region may be bounded by any convex polygon and the second region may be bounded by any convex polygon. By way of further example, in one such embodiment, the ratio of the average cross-layer resistance through a first region of the first current modulating structure, $R^1_{C\text{-}avg}$, to the average cross-layer resistance through a second region of the first current modulating structure, $R^2_{C\text{-}avg}$, is at least 1.5 wherein the first and second regions are each circumscribed by a convex polygon and each comprises at least 10% of the surface area of the first current modulating structure. By way of further example, in one such embodiment, the ratio of the average cross-layer resistance through a first region of the first current modulating structure, $R^1_{C\text{-}avg}$, to the average cross-layer resistance through a second region of the first current modulating structure, $R^2_{C\text{-}avg}$, is at least 2 wherein the first and second regions are each circumscribed by a convex polygon and each comprises at least 10% of the surface area of the first current modulating structure. By way of further example, in one such embodiment, the ratio of the average cross-layer resistance through a first region of the first current modulating structure, $R^1_{C\text{-}avg}$, to the average cross-layer resistance through a second region of the first current modulating structure, $R^2_{C\text{-}avg}$, is at least 3 wherein the first and second regions are each circumscribed by a convex polygon and each comprises at least 10% of the surface area of the first current modulating structure. In one embodiment in each of the foregoing examples, the first and second regions are mutually exclusive regions.

In one embodiment, the non-uniformity in the cross-layer resistance $R_C$ of the second current modulating structure may be observed by comparing the ratio of the average cross-layer resistance, $R_{C\text{-}avg}$ through two different regions of the second current modulating structure 31 wherein the first and second regions are each circumscribed by a convex polygon and each comprises at least 10% of the surface area of the first current modulating structure. For example, in one such embodiment, the ratio of the average cross-layer resistance through a first region of the second current modulating structure 31, $R^1_{C\text{-}avg}$, to the average cross-layer resistance through a second region of the second current modulating structure, $R^2_{C\text{-}avg}$, is at least 1.25 wherein each of the first and second regions is circumscribed by a convex polygon, and each comprises at least 10% of the surface area of the first current modulating structure. This may be illustrated by reference to FIG. 9. Second current modulating structure 31 comprises convex polygon A and convex polygon B and each circumscribes a region comprising at least 10% of the surface area of second current modulating structure 31; in one embodiment, the ratio of the average cross-layer resistance, $R^1_{C\text{-}avg}$, through a first region of the second current modulating structure bounded by convex polygon A to the average cross-layer resistance, $R^2_{C\text{-}avg}$, through a second region of the second current modulating structure bounded by convex polygon B is at least 1.25. As illustrated, convex polygon A is a triangle and convex polygon B is a square merely for purposes of exemplification; in practice, the first region may be bounded by any convex polygon and the second region may be bounded by any convex polygon. By way of further example, in one such embodiment, the ratio of the average cross-layer resistance through a first region of the second current modulating structure, $R^1_{C\text{-}avg}$, to the average cross-layer resistance through a second region of the second current modulating structure, $R^2_{C\text{-}avg}$, is at least 1.5 wherein the first and second regions are each circumscribed by a convex polygon and each comprises at least 10% of the surface area of the first current modulating structure. By way of further example, in one such embodiment, the ratio of the average cross-layer resistance through a first region of the second current modulating structure, $R^1_{C\text{-}avg}$, to the average cross-layer resistance through a second region of the second current modulating structure, $R^2_{C\text{-}avg}$, is at least 2 wherein the first and second regions are each circumscribed by a convex polygon and each comprises at least 10% of the surface area of the second current modulating structure. By way of further example, in one such embodiment, the ratio of the average cross-layer resistance through a first region of the second current modulating structure, $R^1_{C\text{-}avg}$, to the average cross-layer resistance through a second region of the second current modulating structure, $R^2_{C\text{-}avg}$, is at least 3 wherein the first and second regions are each circumscribed by a convex polygon and each comprises at least 10% of the surface area of the first current modulating structure. In one embodiment in each of the foregoing examples, the first and second regions are mutually exclusive regions.

In one presently preferred embodiment, the ratio of the value of maximum cross-layer resistance, $R_{C\text{-}max}$, to the value of minimum cross-layer resistance, $R_{C\text{-}min}$, in the first current modulating structure 30, the second current modulating structure 31, or both the first current modulating structure 30 and the second current modulating structure 31 is at least about 1.25. In one exemplary embodiment, the ratio of the value of maximum cross-layer resistance, $R_{C\text{-}max}$, to the value of minimum cross-layer resistance, $R_{C\text{-}min}$, in the first current modulating structure 30, the second current modulating structure 31, or both the first current modulating structure 30 and the second current modulating structure 31 is at least about 2. In one exemplary embodiment, the ratio of the value of maximum cross-layer resistance, $R_{C\text{-}max}$, to the value of minimum cross-layer resistance, $R_{C\text{-}min}$, in the first current modulating structure 30, the second current modulating structure 31, or both the first current modulating structure 30 and the second current modulating structure 31 is at least about 3.

To facilitate more rapid switching of electrochromic device 1 from a state of relatively greater transmittance to a state of relatively lesser transmittance, or vice versa, at least one of electrically conductive layers 22, 23 may have a sheet resistance, $R_s$, to the flow of electrons through the layer that is non-uniform. For example, in one embodiment at least one of first and second electrically conductive layers 22, 23 comprises a graded thickness, a graded composition or a patterned composite layer having a non-uniform sheet resistance to the flow of electrons through the layer. By way of further example, in one embodiment one of first and second electrically conductive layers 22, 23 comprises a graded thickness, a graded composition or a patterned composite layer having a non-uniform sheet resistance to the flow of electrons through the layer and the other has a uniform sheet resistance to the flow of electrons through the layer. By way of further example, in one embodiment one of first and second electrically conductive layers 22, 23 comprises one of first and second electrically conductive layers 22, 23 comprises a graded thickness, a graded composition or a patterned composite layer having a non-uniform sheet resistance to the flow of electrons through the layer and the other also has a non-uniform sheet resistance to the flow of electrons through the layer. Without being bound by any particular theory, it is presently believed that an effective variation in the sheet resistance of electrically conductive layer 22, electrically conductive layer 23, or electrically conductive layer 22 and electrically conductive layer 23 may further improve the switching performance of the device by controlling the voltage drop in the conductive layer to provide uniform potential drop or a desired non-uniform potential drop across the device over an area of the device at least 25% of the device area.

In general, electrical circuit modeling may be used to determine the sheet resistance distribution of the first and/or second electrically conductive layers providing the desired switching performance, taking into account the type of electrochromic device, the device shape and dimensions, electrode characteristics, and the placement of electrical connections (e.g., bus bars) to the voltage source. The sheet resistance distribution, in turn, can be controlled, at least in part, by patterning a sublayer in the first and/or second electrically conductive layer(s), grading the thickness of the first and/or second electrically conductive layer(s), grading the composition of the first and/or second electrically conductive layer(s), or patterning the first and/or second electrically conductive layer(s), or some combination of these.

In one embodiment only one of first and second electrically conductive layers 22, 23 has a non-uniform sheet resistance to the flow of electrons through the layer. Alternatively, and typically more preferably, first electrically conductive layer 22 and second electrically conductive layer 23 each have a non-uniform sheet resistance to the flow of electrons through the respective layers. Without being bound by any particular theory, it is presently believed that spatially varying the sheet resistance of electrically conductive layer 22, spatially varying the sheet resistance of electrically conductive layer 23, or spatially varying the sheet resistance of electrically conductive layer 22 and electrically conductive layer 23 improves the switching performance of the device by controlling the voltage drop in the conductive layer to provide uniform potential drop or a desired non-uniform potential drop across the device, over the area of the device.

In one exemplary embodiment, the electrochromic device is a rectangular electrochromic window. Referring again to FIG. 1, in this embodiment first substrate 24 and second substrate 25 are rectangular panes of glass or other transparent substrate and electrochromic device 1 has two bus bars 26, 27 located on opposite sides of first electrode layer 20 and second electrode layer 21, respectively. When configured in this manner, it is generally preferred that the resistance to the flow of electrons in first electrically conductive layer 22 generally increase with increasing distance from bus bar 26 and that the resistance to the flow of electrons in second electrically conductive layer 23 generally increase with increasing distance from bus bar 27. This, in turn, can be effected, for example, by decreasing the thickness of first electrically conductive layer 22 as a function of increasing distance from bus bar 26 and decreasing the thickness of second electrically conductive layer 23 as a function of increasing distance from bus bar 27.

As previously noted, the multi-layer devices of the present invention may have a shape other than rectangular, may have more than two bus bars, and/or may not have the bus bars on opposite sides of the device. For example, the multi-layer device may have a perimeter that is more generally a quadrilateral, or a shape with greater or fewer sides than four for example, the multi-layer device may be triangular, pentagonal, hexagonal, etc., in shape. By way of further example, the multi-layer device may have a perimeter that is curved but lacks vertices, e.g., circular, oval, etc. By way of further example, the multi-layer device may comprise three, four or more bus bars connecting the multi-layer device to a voltage source, or the bus bars, independent of number may be located on non-opposing sides. In each of such instances, the preferred resistance profile in the electrically conductive layer(s) may vary from that which is described for the rectangular, two bus bar configuration.

In general, however, and independent of whether the multi-layer device has a shape other than rectangular, there are more than two electrical connections (e.g., bus bars), and/or the electrical connections (e.g., bus bars) are on opposite sides of the device, the sheet resistance, $R_s$, in the first electrically conductive layer 22, in the second electrically conductive layer 23, or in the first electrically conductive layer 22 and the second electrically conductive layer 23 may be plotted to join points of equal sheet resistance (i.e., isoresistance lines) as a function of (two-dimensional) position within the first and/or second electrically conductive layer. Plots of this general nature, sometimes referred to as contour maps, are routinely used in cartography to join points of equal elevation. In the context of the present invention, a contour map of the sheet resistance, $R_s$, in the first and/or second electrically conductive layer as a function of (two-dimensional) position within the first and/or second electrically conductive layer preferably contains a series of isoresistance lines (also sometimes referred to as contour lines) and resistance gradient lines (lines perpendicular to the isoresistance lines). The sheet resistance along a gradient line in the first and/or second electrically conductive layer(s) generally increase(s), generally decrease(s), generally increase(s) until it reaches a maximum and then generally decrease(s), or generally decrease(s) until it reaches a minimum and then generally increase(s).

Figure 10D:
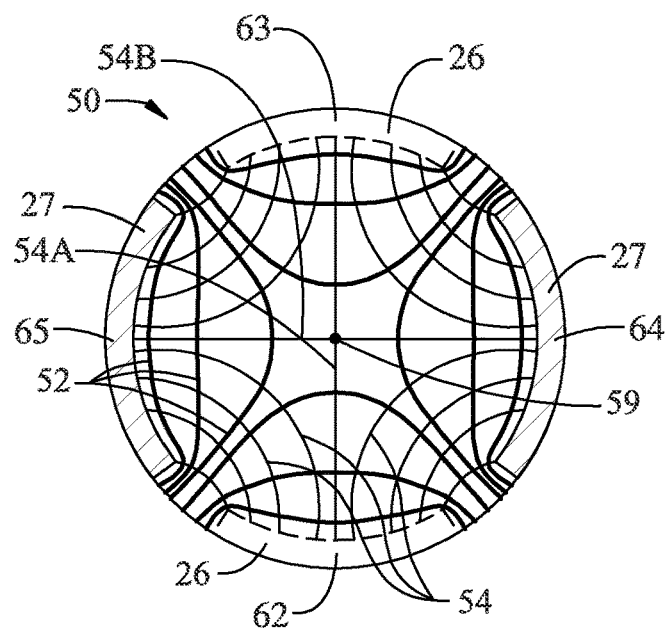
Figure 10E:
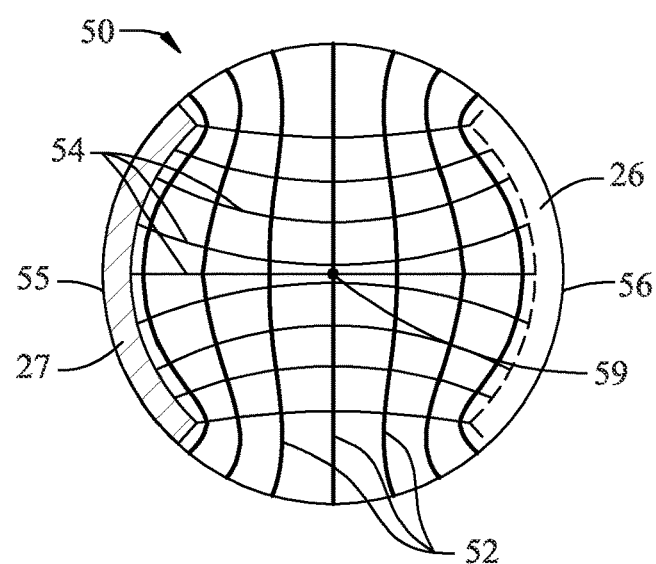

FIGS. 10A-10E depict a contour map of the sheet resistance, $R_s$, in an electrically conductive layer (i.e., the first electrically conductive layer, the second electrically conductive layer, or each of the first and second electrically conductive layers) as a function of (two-dimensional) position within the electrically conductive layer for several exemplary embodiments of an electrochromic stack in accordance with one embodiment of the present invention. In each of FIGS. 10A-10E, contour map 50 depicts a set of sheet isoresistance curves 52 (i.e., curves along which the sheet resistance, $R_s$, has a constant value) and a set of resistance gradient curves 54 that are perpendicular to isoresistance curves 52 resulting from an electrochromic stack having a perimeter that is square (FIGS. 10A, 10B, and 10C) or circular (FIGS. 10D and 10E) and varying numbers and locations of bus bars 26 and 27 in contact with the first and second electrically conductive layers (not labeled) of the electrochromic stack. In FIG. 10A, the direction of the set of gradients 54 indicates that the sheet resistance, $R_s$, within the electrically conductive layer progressively increases along the set of gradients 54 and between west side 55 and east side 56 of the electrically conductive layer in contact with bus bar 27. In FIG. 10B, the direction of gradient 54A indicates that the sheet resistance, $R_s$, within the electrically conductive layer in contact with bus bar 27 progressively decreases from southwest corner 57 to centroid 59 and then decreases from centroid 59 to northeast corner 58. In FIG. 10C, the direction of the set of gradients 54 indicate that the sheet resistance, $R_s$, within the electrically conductive layer in contact with bus bar 27 progressively decreases from the west side 60 and east side 61 to centroid 59 and progressively increases from the top side 58 and bottom side 57 to centroid 59; stated differently, sheet resistance, $R_s$, forms a saddle like form centered around centroid 59. In FIG. 10D, the direction of gradients 54a and 54b indicates that the sheet resistance, $R_s$, within the electrically conductive layer in contact with bus bar 27 progressively decreases from each of positions 64 and 65 to centroid 59 and progressively increases from each of positions 63 and 62 to centroid 59; stated differently, sheet resistance, $R_s$, forms a saddle like form centered around centroid 59. In FIG. 10E, the direction of the set of gradients 54 indicates that the sheet resistance, $R_s$, within the electrically conductive layer in contact with bus bar 27 progressively decreases from the west side 55 to the east side 56. In one embodiment, for example, the gradient in sheet resistance is a constant. By way of further example, in one embodiment, the gradient in sheet resistance is a constant and the substrate is rectangular in shape.

In one embodiment, the ratio of the value of maximum sheet resistance, $R_{max}$, to the value of minimum sheet resistance, $R_{min}$, in the first electrically conductive layer is at least about 1.25. In one exemplary embodiment, the ratio of the value of maximum sheet resistance, $R_{max}$, to the value of minimum sheet resistance, $R_{min}$, in the first electrically conductive layer is at least about 1.5. In one exemplary embodiment, the ratio of the value of maximum sheet resistance, $R_{max}$, to the value of minimum sheet resistance, $R_{min}$, in the first electrically conductive layer is at least about 2. In one exemplary embodiment, the ratio of the value of maximum sheet resistance, $R_{max}$, to the value of minimum sheet resistance, $R_{min}$, in the first electrically conductive layer is at least about 3. In one exemplary embodiment, the ratio of the value of maximum sheet resistance, $R_{max}$, to the value of minimum sheet resistance, $R_{min}$, in the first electrically conductive layer is at least about 4. In one exemplary embodiment, the ratio of the value of maximum sheet resistance, $R_{max}$, to the value of minimum sheet resistance, $R_{min}$, in the first electrically conductive layer is at least about 5. In one exemplary embodiment, the ratio of the value of maximum sheet resistance, $R_{max}$, to the value of minimum sheet resistance, $R_{min}$, in the first electrically conductive layer is at least about 6. In one exemplary embodiment, the ratio of the value of maximum sheet resistance, $R_{max}$, to the value of minimum sheet resistance, $R_{min}$, in the first electrically conductive layer is at least about 7. In one exemplary embodiment, the ratio of the value of maximum sheet resistance, $R_{max}$, to the value of minimum sheet resistance, $R_{min}$, in the first electrically conductive layer is at least about 8. In one exemplary embodiment, the ratio of the value of maximum sheet resistance, $R_{max}$, to the value of minimum sheet resistance, $R_{min}$, in the first electrically conductive layer is at least about 9. In one exemplary embodiment, the ratio of the value of maximum sheet resistance, $R_{max}$, to the value of minimum sheet resistance, $R_{min}$, in the first electrically conductive layer is at least about 10.

Figure 11:
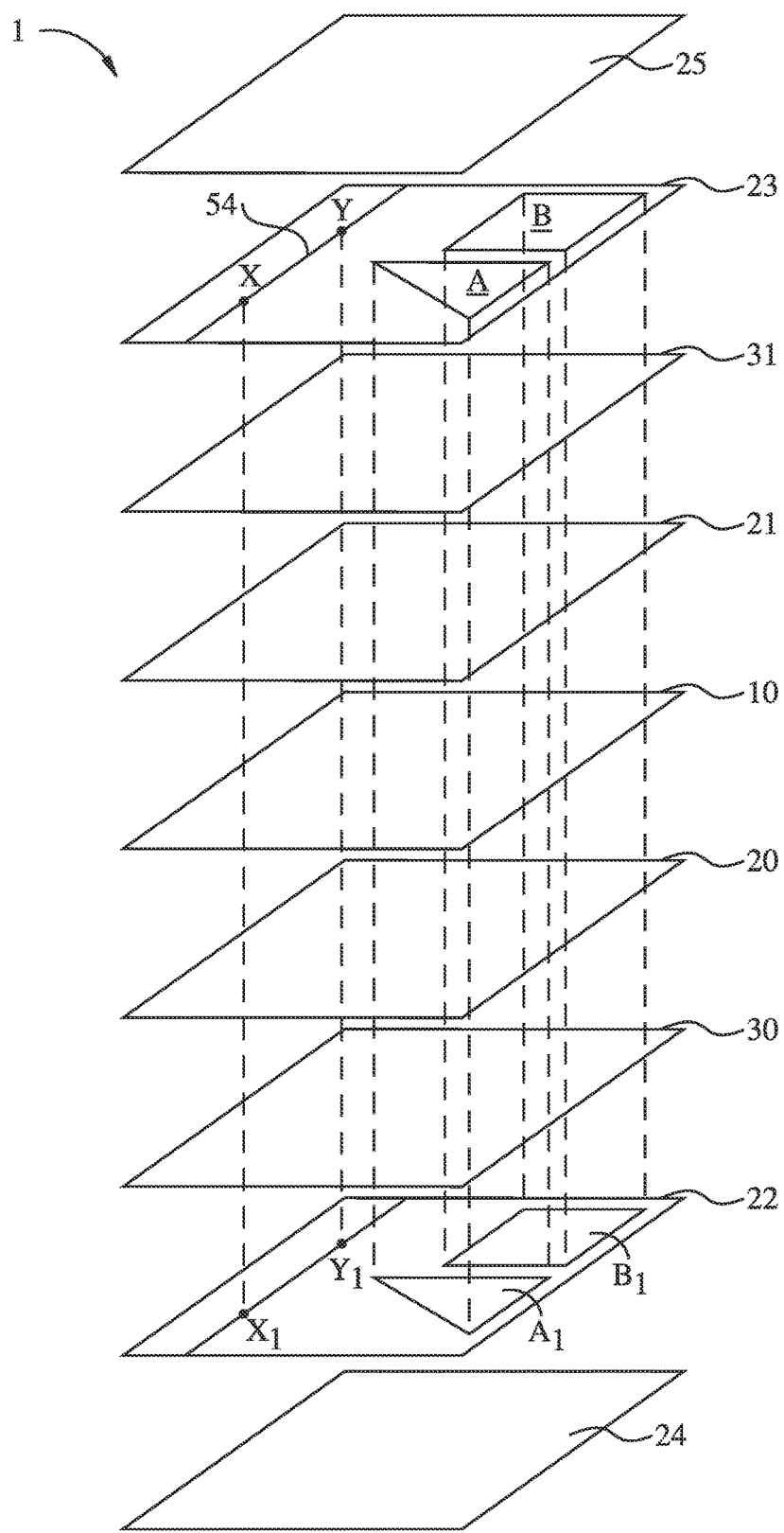
FIG. 11 is an exploded view of the multi-layer device of FIG. 1.
Figure 12A:
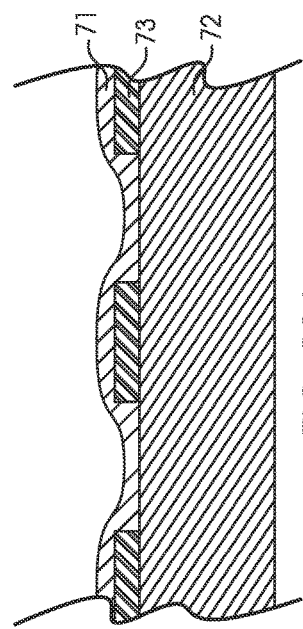
FIGS. 12A and 12B are schematic cross-sections showing two alternative embodiments for patterning the first and second materials in the electrically conductive layer(s).
Figure 12B:
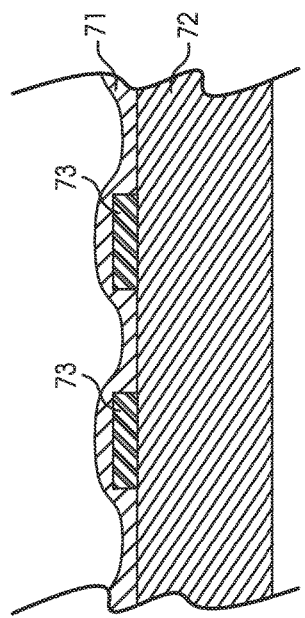
Figure 12C:
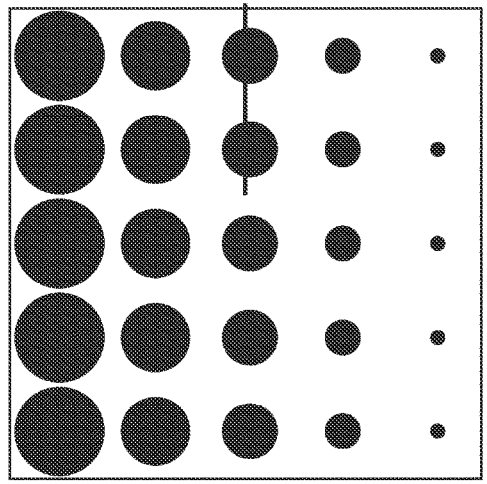
FIGS. 12C and 12D show corresponding exemplary patterns that may be achieved by patterning a transparent conductive oxide (TCO) layer and a second material (resistor) having a resistivity at least two orders of magnitude greater than the TCO.
Figure 12D:
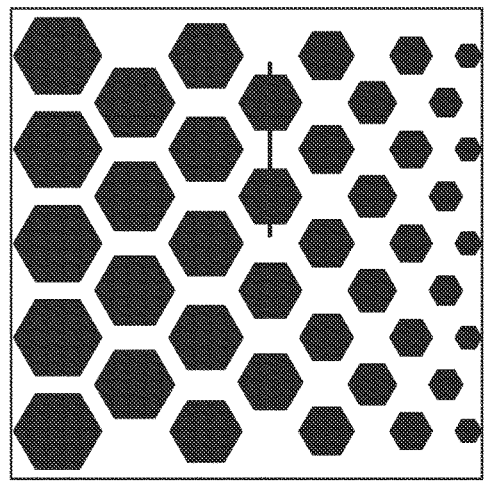
Figure 13A:
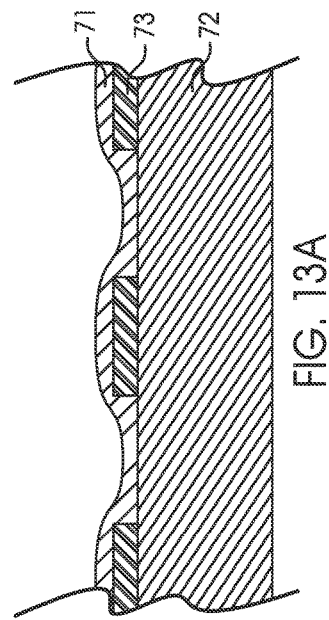
FIGS. 13A and 13B are schematic cross-sections showing two alternative embodiments for patterning the first and second materials in the electrically conductive layer(s).
Figure 13B:
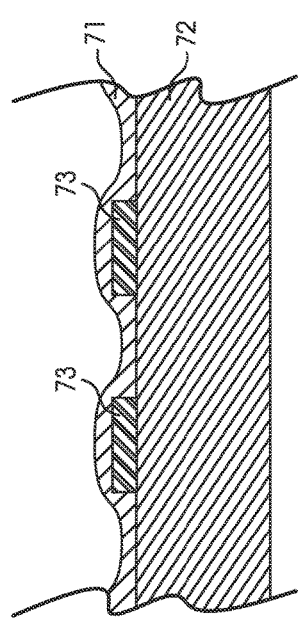
Figure 13C:
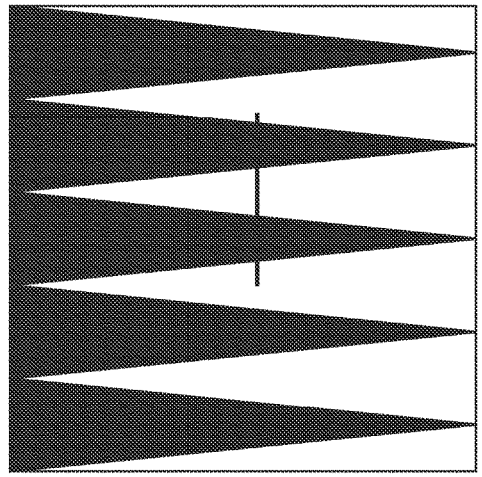
FIGS. 13C and 13D show corresponding exemplary patterns that may be achieved by patterning a transparent conductive oxide (TCO) layer and a second material (resistor) having a resistivity at least two orders of magnitude greater than the TCO.
Figure 13D:
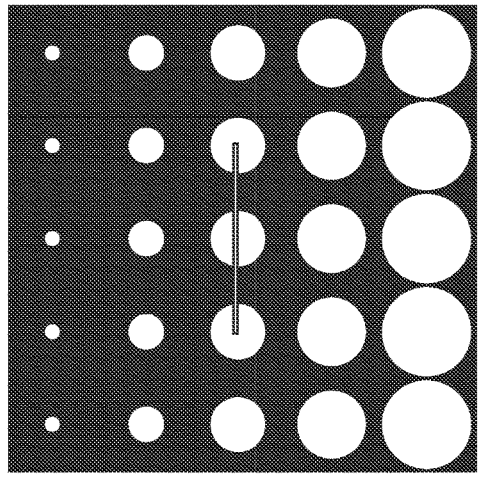

FIG. 11 illustrates the non-uniformity in the sheet resistance of first electrically conductive layer 22 of multi-layer electrochromic device 1. First electrically conductive layer 22 comprises a sheet resistance gradient curve (the line comprising line segment $X_1$-$Y_1$, indicating that the sheet resistance, $R_s$, within electrically conductive layer 22 progressively increases as described in connection with FIGS. 10A-E). Between $X_1$ and $Y_1$, the sheet resistance of first electrically conductive layer 22 generally increases, generally decreases or generally increases and then decreases. In one embodiment, line segment $X_1$-$Y_1$ has a length of at least 1 cm. For example, line segment $X_1$-$Y_1$ may have a length of 2.5 cm, 5 cm, 10 cm, or 25 cm. Additionally, line segment $X_1$-$Y_1$ may be straight or curved.

In one embodiment, the non-uniformity in the sheet resistance of the first electrically conductive layer may be observed by comparing the ratio of the average sheet resistance, $R_{avg}$ in two different regions of the first electrically conductive layer wherein the first and second regions are each circumscribed by a convex polygon and each comprises at least 25% of the surface area of the first electrically conductive layer. For example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.25 wherein each of the first and second regions is circumscribed by a convex polygon, and each comprises at least 25% of the surface area of the first electrically conductive layer. This may be illustrated by reference to FIG. 11. First electrically conductive layer 22 comprises convex polygon $A_1$ and convex polygon $B_1$ and each circumscribes a region comprising at least 25% of the surface area of first electrically conductive layer 22; in one embodiment, the ratio of the average sheet resistance, $R^1_{avg}$, in a first region of the first electrically conductive layer bounded by convex polygon $A_1$ to the average sheet resistance, $R^2_{avg}$, in a second region of the first electrically conductive layer bounded by convex polygon $B_1$ is at least 1.25. As illustrated, convex polygon $A_1$ is a triangle and convex polygon $B_1$ is a square merely for purposes of exemplification; in practice, the first region may be bounded by any convex polygon and the second region may be bounded by any convex polygon. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.5 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 2 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 3 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 4 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 5 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 6 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 7 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 8 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 9 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 10 wherein the first and second regions are each circumscribed by a convex polygon and each comprises at least 25% of the surface area of the first electrically conductive layer. In one embodiment in each of the foregoing examples, the first and second regions are mutually exclusive regions.

In one embodiment, the non-uniformity in the sheet resistance of the first electrically conductive layer may be observed by comparing the average sheet resistance, $R_{avg}$ in four different regions of the first electrically conductive layer wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. For example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.25, the ratio of the average sheet resistance in the second region of the first electrically conductive layer, $R^2_{avg}$, to the average sheet resistance in a third region of the first electrically conductive layer, $R^3_{avg}$, is at least 1.25, the ratio of the average sheet resistance in the third region of the first electrically conductive layer, $R^3_{avg}$, to the average sheet resistance in a fourth region of the first electrically conductive layer, $R^4_{avg}$, is at least 1.25, wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.5, the ratio of the average sheet resistance in the second region of the first electrically conductive layer, $R^2_{avg}$, to the average sheet resistance in a third region of the first electrically conductive layer, $R^3_{avg}$, is at least 1.5, the ratio of the average sheet resistance in the third region of the first electrically conductive layer, $R^3_{avg}$, to the average sheet resistance in a fourth region of the first electrically conductive layer, $R^4_{avg}$, is at least 1.5, wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 2, the ratio of the average sheet resistance in the second region of the first electrically conductive layer, $R^2_{avg}$, to the average sheet resistance in a third region of the first electrically conductive layer, $R^3_{avg}$, is at least 2, the ratio of the average sheet resistance in the third region of the first electrically conductive layer, $R^3_{avg}$, to the average sheet resistance in a fourth region of the first electrically conductive layer, $R^4_{avg}$, is at least 2, wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. In one embodiment in each of the foregoing examples, the first, second, third and fourth regions are mutually exclusive regions.

In one presently preferred embodiment, the second electrically conductive layer has a sheet resistance, $R_s$, to the flow of electrical current through the second electrically conductive layer that varies as a function of position in the second electrically conductive layer. In one such embodiment, the ratio of the value of maximum sheet resistance, $R_{max}$, to the value of minimum sheet resistance, $R_{min}$, in the second electrically conductive layer is at least about 1.25. In one exemplary embodiment, the ratio of the value of maximum sheet resistance, $R_{max}$, to the value of minimum sheet resistance, $R_{min}$, in the second electrically conductive layer is at least about 1.5. In one exemplary embodiment, the ratio of the value of maximum sheet resistance, $R_{max}$, to the value of minimum sheet resistance, $R_{min}$, in the second electrically conductive layer is at least about 2. In one exemplary embodiment, the ratio of the value of maximum sheet resistance, $R_{max}$, to the value of minimum sheet resistance, $R_{min}$, in the second electrically conductive layer is at least about 3. In one exemplary embodiment, the ratio of the value of maximum sheet resistance, $R_{max}$, to the value of minimum sheet resistance, $R_{min}$, in the second electrically conductive layer is at least about 4. In one exemplary embodiment, the ratio of the value of maximum sheet resistance, $R_{max}$, to the value of minimum sheet resistance, $R_{min}$, in the second electrically conductive layer is at least about 5. In one exemplary embodiment, the ratio of the value of maximum sheet resistance, $R_{max}$, to the value of minimum sheet resistance, $R_{min}$, in the second electrically conductive layer is at least about 6. In one exemplary embodiment, the ratio of the value of maximum sheet resistance, $R_{max}$, to the value of minimum sheet resistance, $R_{min}$, in the second electrically conductive layer is at least about 7. In one exemplary embodiment, the ratio of the value of maximum sheet resistance, $R_{max}$, to the value of minimum sheet resistance, $R_{min}$, in the second electrically conductive layer is at least about 8. In one exemplary embodiment, the ratio of the value of maximum sheet resistance, $R_{max}$, to the value of minimum sheet resistance, $R_{min}$, in the second electrically conductive layer is at least about 9. In one exemplary embodiment, the ratio of the value of maximum sheet resistance, $R_{max}$, to the value of minimum sheet resistance, $R_{min}$, in the second electrically conductive layer is at least about 10.

FIG. 11 illustrates the non-uniformity in the sheet resistance of second electrically conductive layer 23 of multi-layer electrochromic device 1. Electrically conductive layer 22 comprises sheet resistance gradient curve 54 which includes line segment X-Y; between X and Y, the sheet resistance of second electrically conductive layer 23 generally increases, generally decreases or generally increases and then decreases. In one embodiment, line segment $X_1$-$Y_1$ has a length of at least 1 cm. For example, line segment X-Y may have a length of 2.5 cm, 5 cm, 10 cm, or 25 cm. Additionally, line segment X-Y may be straight or curved.

In one embodiment, the non-uniformity in the sheet resistance of the second electrically conductive layer may be observed by comparing the ratio of the average sheet resistance, $R_{avg}$ in two different regions of the second electrically conductive layer wherein the first and second regions are each circumscribed by a convex polygon and each comprises at least 25% of the surface area of the second electrically conductive layer. For example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.25 wherein the first and second regions are each circumscribed by a convex polygon and each comprises at least 25% of the surface area of the second electrically conductive layer. This may be illustrated by reference to FIG. 11. Second electrically conductive layer 23 comprises convex polygon A and convex polygon B and each circumscribes a region comprising at least 25% of the surface area of second electrically conductive layer 23; in one embodiment, the ratio of the average sheet resistance, $R^1_{avg}$, in a first region of the second electrically conductive layer bounded by convex polygon A to the average sheet resistance, $R^2_{avg}$, in a second region of the second electrically conductive layer bounded by convex polygon B is at least 1.25. As illustrated, convex polygon A is a triangle and convex polygon B is a square merely for purposes of exemplification; in practice, the first region may be bounded by any convex polygon and the second region may be bounded by any convex polygon. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.5 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 2 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 3 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 4 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 5 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 6 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 7 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 8 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 9 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 10 wherein the first and second regions are each circumscribed by a convex polygon and each comprises at least 25% of the surface area of the second electrically conductive layer. In one embodiment in each of the foregoing examples, the first and second regions are mutually exclusive regions.

In one embodiment, the non-uniformity in the sheet resistance of the second electrically conductive layer may be observed by comparing the average sheet resistance, $R_{avg}$ in four different regions of the second electrically conductive layer wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. For example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.25, the ratio of the average sheet resistance in the second region of the second electrically conductive layer, $R^2_{avg}$, to the average sheet resistance in a third region of the second electrically conductive layer, $R^3_{avg}$, is at least 1.25, the ratio of the average sheet resistance in the third region of the second electrically conductive layer, $R^3_{avg}$, to the average sheet resistance in a fourth region of the second electrically conductive layer, $R^4_{avg}$, is at least 1.25, wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.5, the ratio of the average sheet resistance in the second region of the second electrically conductive layer, $R^2_{avg}$, to the average sheet resistance in a third region of the second electrically conductive layer, $R^3_{avg}$, is at least 1.5, the ratio of the average sheet resistance in the third region of the second electrically conductive layer, $R^3_{avg}$, to the average sheet resistance in a fourth region of the second electrically conductive layer, $R^4_{avg}$, is at least 1.5, wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 2, the ratio of the average sheet resistance in the second region of the second electrically conductive layer, $R^2_{avg}$, to the average sheet resistance in a third region of the second electrically conductive layer, $R^3_{avg}$, is at least 2, the ratio of the average sheet resistance in the third region of the second electrically conductive layer, $R^3_{avg}$, to the average sheet resistance in a fourth region of the second electrically conductive layer, $R^4_{avg}$, is at least 2, wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. In one embodiment in each of the foregoing examples, the first, second, third and fourth regions are mutually exclusive regions.

In one presently preferred embodiment, first and second electrically conductive layers 22, 23 have a sheet resistance, $R_s$, to the flow of electrical current through the second electrically conductive layer that varies as a function of position in the first and second electrically conductive layers. Although it is generally preferred in this embodiment that the ratio of the value of maximum sheet resistance, $R_{max}$, to the value of minimum sheet resistance, $R_{min}$, in the first and second electrically conductive layers be approximately the same, they may have different values. For example, in one such embodiment, the ratio of the value of maximum sheet resistance, $R_{max}$, to the value of minimum sheet resistance, $R_{min}$, in the first electrically conductive layer has a value that is at least twice as much as the ratio of the value of maximum sheet resistance, $R_{max}$, to the value of minimum sheet resistance, $R_{min}$, in the second electrically conductive layer. More typically, however, the ratio of the value of maximum sheet resistance, $R_{max}$, to the value of minimum sheet resistance, $R_{min}$, in the first and second electrically conductive layers will be approximately the same and each at least about 1.25. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in the first and second electrically conductive layers will be approximately the same and each at least about 1.5. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 2. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 3. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 4. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 5. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 6. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 7. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 8. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 9. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 10.

In one embodiment, the non-uniformity in the sheet resistance of the first and second electrically conductive layers may be observed by comparing the ratio of the average sheet resistance, $R_{avg}$ in two different regions of the first and second electrically conductive layers, respectively, wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. For example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.25 and the ratio of the average sheet resistance in a first region of the second electrically conductive layer, $R^1_{avg}$, to the average sheet resistance in a second region of the second electrically conductive layer, $R^2_{avg}$, is at least 1.25 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.5 and the ratio of the average sheet resistance in a first region of the second electrically conductive layer, $R^1_{avg}$, to the average sheet resistance in a second region of the second electrically conductive layer, $R^2_{avg}$, is at least 1.5 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 2 and the ratio of the average sheet resistance in a first region of the second electrically conductive layer, $R^1_{avg}$, to the average sheet resistance in a second region of the second electrically conductive layer, $R^2_{avg}$, is at least 2 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 3 and the ratio of the average sheet resistance in a first region of the second electrically conductive layer, $R^1_{avg}$, to the average sheet resistance in a second region of the second electrically conductive layer, $R^2_{avg}$, is at least 3 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 4 and the ratio of the average sheet resistance in a first region of the second electrically conductive layer, $R^1_{avg}$, to the average sheet resistance in a second region of the second electrically conductive layer, $R^2_{avg}$, is at least 4 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 5 and the ratio of the average sheet resistance in a first region of the second electrically conductive layer, $R^1_{avg}$, to the average sheet resistance in a second region of the second electrically conductive layer, $R^2_{avg}$, is at least 5 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 6 and the ratio of the average sheet resistance in a first region of the second electrically conductive layer, $R^1_{avg}$, to the average sheet resistance in a second region of the second electrically conductive layer, $R^2_{avg}$, is at least 6 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 7 and the ratio of the average sheet resistance in a first region of the second electrically conductive layer, $R^1_{avg}$, to the average sheet resistance in a second region of the second electrically conductive layer, $R^2_{avg}$, is at least 7 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 8 and the ratio of the average sheet resistance in a first region of the second electrically conductive layer, $R^1_{avg}$, to the average sheet resistance in a second region of the second electrically conductive layer, $R^2_{avg}$, is at least 8 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 9 and the ratio of the average sheet resistance in a first region of the second electrically conductive layer, $R^1_{avg}$, to the average sheet resistance in a second region of the second electrically conductive layer, $R^2_{avg}$, is at least 9 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 10 and the ratio of the average sheet resistance in a first region of the second electrically conductive layer, $R^1_{avg}$, to the average sheet resistance in a second region of the second electrically conductive layer, $R^2_{avg}$, is at least 10 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. In one embodiment in each of the foregoing examples, the first and second regions are mutually exclusive regions.

Referring again to FIG. 11, the spatial non-uniformity of the sheet resistance of the first and second electrically conductive layer may be correlated in accordance with one aspect of the present invention. For example, line segment $X_1$-$Y_1$ in first electrically conductive layer 22 may be projected through second electrode layer 21, ion conductor layer 10 and first electrode layer 20 and onto second electrically conductive layer 23, with the projection defining line segment X-Y. In general, if the sheet resistance generally increases in first electrically conductive layer 22 along line segment $X_1$-$Y_1$ (i.e., the sheet resistance generally increases moving along the sheet resistance gradient curve in the direction from point $X_1$ to point $Y_1$), the sheet resistance generally decreases in second electrically conductive layer 23 along segment X-Y (i.e., the sheet resistance generally decreases along sheet resistance gradient curve 54 and in the direction from point X to point Y). As previously noted, line segments X-Y and $X_1$-$Y_1$ have a length of at least 1 cm. For example, line segments X-Y and $X_1$-$Y_1$ may have a length of 2.5 cm, 5 cm, 10 cm, or 25 cm. Additionally, line segments X-Y and $X_1$-$Y_1$ may be straight or curved. In one embodiment, for example, the sheet resistance gradients in electrically conductive layers 22, 23 are non-zero constants and are of opposite sign (e.g., the sheet resistance generally increases linearly in first electrically conductive layer along in the direction from point $X_1$ to point $Y_1$ and generally decreases linearly along sheet resistance gradient curve 54 in the direction from point X to point Y). By way of further example, in one embodiment, substrates 24, 25 are rectangular and the sheet resistance gradients in electrically conductive layers 22, 23 are non-zero constants and are of opposite sign (e.g., the sheet resistance generally increases linearly in second electrically conductive layer 23 along gradient 54 in the direction from point X to point Y and generally decreases linearly in first electrically conductive layer 22 along the line containing line segment $X_1$-$Y_1$ in the direction from point $X_1$ to point $Y_1$).

In another embodiment, and still referring to FIG. 11, the spatial non-uniformity of the sheet resistance of the first and second electrically conductive layers may be characterized by reference to separate first and second regions in the first electrically conductive layer and their projections onto the second electrically conductive layer to define complementary first and second regions in the second electrically conductive layer wherein the first and second regions of the first electrically conductive layer are each bounded by a convex polygon, each contain at least 25% of the surface area of the first electrically conductive layer, and are mutually exclusive regions. In general, the first electrically conductive layer has an average sheet resistance in the first and regions of the first electrically conductive layer and the second electrically conductive layer has an average sheet resistance in the complementary first and second regions of the second electrically conductive layer wherein: (a) (i) a ratio of the average sheet resistance of the first electrically conductive layer in the first region to the average sheet resistance of the first electrically conductive layer in the second region is at least 1.5 or (ii) a ratio of the average sheet resistance of the second electrically conductive layer in the complementary first region to the average sheet resistance of the second electrically conductive layer in the complementary second region is greater than 1.5 and (b) a ratio of the average sheet resistance of the first electrically conductive layer in the first region to the average sheet resistance of the second electrically layer in the complementary first region (i.e., the projection of the first region of the first electrically conductive layer onto the second electrically conductive layer) is at least 150% of the ratio of the average sheet resistance of the first electrically conductive layer in the second region to the average sheet resistance of the second electrically layer in the complementary second region (i.e., the projection of the second region of the first electrically conductive layer onto the second electrically conductive layer).

Referring again to FIG. 11, first electrically conductive layer 22 comprises a region $A_1$ and a region $B_1$ wherein region $A_1$ and region $B_1$ each comprise at least 25% of the surface area of the first electrically conductive layer, are each circumscribed by a convex polygon and are mutually exclusive regions. A projection of region $A_1$ onto second electrically conductive layer 23 defines a region A circumscribed by a convex polygon in the second electrically conductive layer comprising at least 25% of the surface area of the second electrically conductive layer. A projection of region $B_1$ onto the second electrically conductive layer defines a region B circumscribed by a convex polygon in the second electrically conductive layer comprising at least 25% of the surface area of the second electrically conductive layer. First electrically conductive layer 22 has an average sheet resistance in region $A_1$ corresponding to $R^{A1}_{avg}$ and an average sheet resistance in region $B_1$ corresponding to $R^{B1}_{avg}$. Second electrically conductive layer 23 has an average sheet resistance in region A corresponding to $R^{A}_{avg}$ and an average sheet resistance in region B corresponding to $R^{B}_{avg}$. In accordance with one embodiment, (i) the ratio of $R^{A1}_{avg}$ to $R^{B1}_{avg}$ or the ratio of $R^{B}_{avg}$ to $R^{A}_{avg}$ is at least 1.5 and (ii) the ratio of $(R^{A1}_{avg}/R^{A}_{avg})$ to $(R^{B1}_{avg}/R^{B}_{avg})$ is at least 1.5. For example, in one embodiment, (i) the ratio of $R^{A1}_{avg}$ to $R^{B1}_{avg}$ or the ratio of $R^{B}_{avg}$ to $R^{A}_{avg}$ is at least 1.75 and (ii) the ratio of $(R^{A1}_{avg}/R^{A}_{avg})$ to $(R^{B1}_{avg}/R^{B}_{avg})$ is at least 1.75. By way of further example, in one embodiment, (i) the ratio of $R^{A1}_{avg}$ to $R^{B1}_{avg}$ or the ratio of $R^{B}_{avg}$ to $R^{A}_{avg}$ is at least 2 and (ii) the ratio of $(R^{A1}_{avg}/R^{A}_{avg})$ to $(R^{B1}_{avg}/R^{B}_{avg})$ is at least 2. By way of further example, in one embodiment, (i) the ratio of $R^{A1}_{avg}$ to $R^{B1}_{avg}$ or the ratio of $R^{B}_{avg}$ to $R^{A}_{avg}$ is at least 3 and (ii) the ratio of $(R^{A1}_{avg}/R^{A}_{avg})$ to $(R^{B1}_{avg}/R^{B}_{avg})$ is at least 3. By way of further example, in one embodiment, (i) the ratio of $R^{A1}_{avg}$ to $R^{B1}_{avg}$ or the ratio of $R^{B}_{avg}$ to $R^{A}_{avg}$ is at least 5 and (ii) the ratio of $(R^{A1}_{avg}/R^{A}_{avg})$ to $(R^{B1}_{avg}/R^{B}_{avg})$ is at least 5. By way of further example, in one embodiment, (i) the ratio of $R^{A1}_{avg}$ to $R^{B1}_{avg}$ or the ratio of $R^{B}_{avg}$ to $R^{A}_{avg}$ is at least 10 and (ii) the ratio of $(R^{A1}_{avg}/R^{A}_{avg})$ to $(R^{B1}_{avg}/R^{B}_{avg})$ is at least 10.

Without wishing to be bound by any particular theory, and based upon certain experimental evidence obtained to-date, in certain embodiments the electrode sheet resistance may be expressed as a function of position in a large area electrochromic device that provides a local voltage drop across the electrochromic stack that is substantially constant. For the simple geometry shown in FIG. 1, where the contact (bus bar 27) to the top electrode is made at x=0 and the contact (bus bar 26) to the bottom electrode is made at x=xt, the relationship is simply that $$R'(x)=R(x)*(xt/x-1);$$

where R(x) is the sheet resistance of the top electrode as a function of position and R'(x) is the sheet resistance of the bottom electrode as a function of position. A simple mathematical example of this relationship is that for a linear change in the sheet resistance of the top electrode, R(x)=a*x, the sheet resistance of the bottom electrode must be R'(x)= a*(xt−x). Another simple example is that for R(x)=1/(xt− a*x) then R'(x)=1/(a*x). This relationship holds in a mathematical sense for any function R(x). This relationship can be generalized to any electrode sheet resistance distribution that smoothly varies and any contact configuration by the following relationship between the sheet resistance from one contact (z=0) to anther (z=L) along gradient curves that are perpendicular to iso-resistance lines R(z), and the corresponding opposing electrode sheet resistance distribution R'(z).

$$R'(z)=R(z)*(L/z-1);$$

As a practical matter, devices do not need to precisely adhere to this relationship to realize the benefits of this invention. For example, in the case above where R'(x)=1/(a*x), R'(0)= infinity. While one can practically create resistances of very large magnitude, a film with a R'(x)=1/(a*x+b) where b is small relative to a can exhibit significantly improved switching uniformity over a device comprising electrodes of uniform sheet resistance.

Electrically conductive layers having a non-uniform sheet resistance may be prepared by a range of methods. In one embodiment, the non-uniform sheet resistance is the result of a composition variation in the layer; composition variations may be formed, for example, by sputter coating from two cylindrical targets of different materials while varying the power to each target as a function of position relative to the substrate, by reactive sputter coating from a cylindrical target while varying the gas partial pressure and/or composition as a function of position relative to the substrate, by spray coating with a varying composition or process as a function of position relative to the substrate, or by introducing a dopant variation to a uniform composition and thickness film by ion implantation, diffusion, or reaction. In another embodiment, the non-uniform sheet resistance is the result of a thickness variation in the layer; thickness variations may be formed, for example, by sputter coating from a cylindrical target while varying the power to the target as a function of as a function of position relative to the substrate, sputter coating from a target at constant power and varying the velocity of substrate under the target as a function of as a function of position relative to the substrate, a deposited stack of uniform films on a substrate where each film has a limited spatial extent. Alternatively, a thickness gradient can be formed by starting with a uniform thickness conductive layer and then etching the layer in a way that is spatially non-uniform such as dip-etching or spraying with etchant at a non-uniform rate across the layer. In another embodiment, the non-uniform sheet resistance is the result of patterning; gradients may be introduced, for example, by laser patterning a series of scribes into a constant thickness and constant resistivity film to create a desired spatially varying resistivity. In addition to laser patterning, mechanical scribing and lithographic patterning using photoresists (as known in the art of semiconductor device manufacturing) can be used to create a desired spatially varying resistivity. In another embodiment, the non-uniform sheet resistance is the result of a defect variation; a defect variation may be introduced, for example, by introducing spatially varying defects via ion implantation, or creating a spatially varying defect density via a spatially varying annealing process applied to a layer with a previously uniform defect density.

In one embodiment, at least one of electrically conductive layers 22, 23 is a composite of a first material, an electrically conductive material, and a second less conductive material. For example, in one embodiment the first material has a resistivity of less than about $10^2$ Ω·cm and the second material has a resistivity that is greater than the resistivity of the first material by a factor of at least $10^2$. By way of further example, in one embodiment the first material has a resistivity of less than about $10^2$ Ω·cm and the second material has a resistivity that is greater than the resistivity of the first material by a factor of at least $10^3$. By way of further example, in one embodiment the first material has a resistivity of less than about $10^2$ Ω·cm and the second material has a resistivity that is greater than the resistivity of the first material by a factor of at least $10^4$. By way of further example, in one embodiment the first material has a resistivity of less than about $10^2$ Ω·cm and the second material has a resistivity that is greater than the resistivity of the first material by a factor of at least $10^5$. By way of further example, in one embodiment the first material has a resistivity of less than about $10^2$ Ω·cm and the second material has a resistivity that is greater than the resistivity of the first material by a factor of at least $10^6$. By way of further example, in one embodiment the first material has a resistivity of less than about $10^2$ Ω·cm and the second material has a resistivity that is greater than the resistivity of the first material by a factor of at least $10^7$. By way of further example, in one embodiment the first material has a resistivity of less than about $10^2$ Ω·cm and the second material has a resistivity that is greater than the resistivity of the first material by a factor of at least $10^8$. By way of further example, in each of the foregoing embodiments, the first and/or second material is transparent. In one such exemplary embodiment, the first material may be selected from transparent conductive oxides, thin metallic coatings, networks of conductive nano particles (e.g., rods, tubes, dots) conductive metal nitrides, and composite conductors and the second material may be selected, in one embodiment, from materials having a resistivity of at least $10^4$ Ω·cm and, in another embodiment, from materials having a resistivity of at least $10^{10}$ Ω·cm.

In general, the second, less conductive, material comprised by a patterned electrically conductive layer of the present invention may be any material exhibiting sufficient resistivity, optical transparency, and chemical stability for the intended application. For example, in some embodiments, at least one of electrically conductive layers 22, 23 comprise a resistive or insulating material with high chemical stability. By way of further example, in some embodiments at least one of electrically conductive layers 22, 23 comprise an insulator material selected from the group consisting of alumina, silica, porous silica, fluorine doped silica, carbon doped silica, silicon nitride, silicon oxynitride, hafnia, magnesium fluoride, magnesium oxide, poly(methyl methacrylate) (PMMA), polyimides, polymeric dielectrics such as polytetrafluoroethylene (PTFE), silicones, and combinations thereof. Exemplary resistive materials include zinc oxide, zinc sulfide, titanium oxide, and gallium (III) oxide, yttrium oxide, zirconium oxide, aluminum oxide, indium oxide, stannic oxide and germanium oxide. In one embodiment, one or both of first and electrically conductive layers 22, 23 comprise(s) one or more of such resistive materials. In another embodiment, one or both of first and electrically conductive layers 22, 23 comprise(s) one or more of such insulating materials. In another embodiment, one or both of first and second electrically conductive layers 22, 23 comprise(s) one or more of such resistive materials and one or more of such insulating materials.

Depending upon the application, the relative proportions of the first material, i.e., the material having a resistivity of less than about $10^2$ Ω·cm (and preferably transparent), and the second material, i.e., the material having a resistivity that exceeds the resistivity of the first material by a factor of at least $10^2$ may vary substantially in electrically conductive layer 22, electrically conductive layer 23, or in each of electrically conductive layers 22, 23. In general, however, the second material constitutes at least about 5 vol % of at least one of electrically conductive layers 22, 23. For example, in one embodiment the second material constitutes at least about 10 vol % of at least one of electrically conductive layers 22, 23. By way of further example, in one embodiment the second material constitutes at least about 20 vol % of at least one of electrically conductive layers 22, 23. By way of further example, in one embodiment the second material constitutes at least about 30 vol % of at least one of electrically conductive layers 22, 23. By way of further example, in one embodiment the second material constitutes at least about 40 vol % of at least one of electrically conductive layers 22, 23. In general, however, the second material will typically not constitute more than about 70 vol % of either of electrically conductive layers 22, 23.

FIGS. 12-15 illustrate several alternative embodiments for patterning the first and second materials in the electrically conductive layer(s).

FIG. 12 illustrates two exemplary patterns (right column) that may be achieved by patterning a transparent conductive oxide (TCO) layer 73 and a second material 71 having a resistivity at least two orders of magnitude greater than the TCO. In each of these embodiments, the TCO material 73 is deposited on the substrate, patterned and overcoated with the second material 71, the overcoat covering the regions containing the TCO material 73 and the gaps between the regions of TCO material. In the top right panel of FIG. 12, the TCO material 73 is deposited as a film and a series of circles are patterned in that film with the circles decreasing in area as a function of distance from the top edge or in the area surrounding the circles. In the bottom right panel, the TCO material 73 is deposited as a film and a series of hexagons are patterned in that film with the hexagons decreasing in area as a function of distance from the top edge or in the area surrounding the circles.

FIG. 13 illustrates two exemplary patterns (right column) that may be achieved by patterning a transparent conductive oxide (TCO) layer 73 and a second material 71 having a resistivity at least two orders of magnitude greater than the TCO. In each of these embodiments, the TCO material 73 is deposited on the substrate, patterned and overcoated with the second material 71, the overcoat covering the regions containing the TCO material 73 and the gaps between the regions of TCO material. In the top right panel of FIG. 13, the width of the TCO material 73 decreases (or alternatively increases) as a function of distance from the top or bottom edge. In the bottom right panel, the TCO material 73 is deposited as a film and a series of circles are patterned ithat film that increase in area as a function of increasing distance from the top edge or in the area surrounding the circles.

Figure 14B:
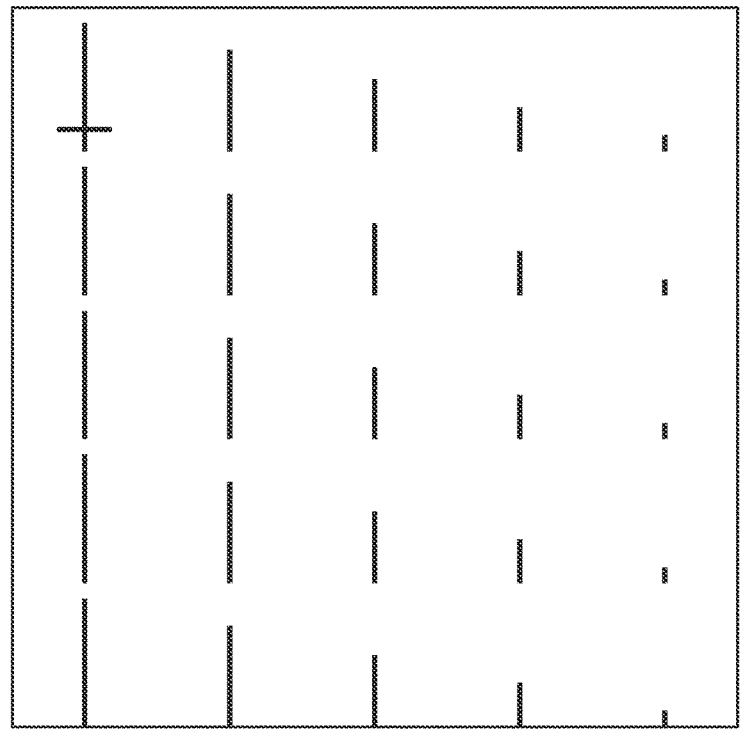
FIG. 14B shows a corresponding exemplary pattern that may be achieved by patterning a transparent conductive oxide (TCO) layer and a second material (resistor) having a resistivity at least two orders of magnitude greater than the TCO.
Figure 14A:
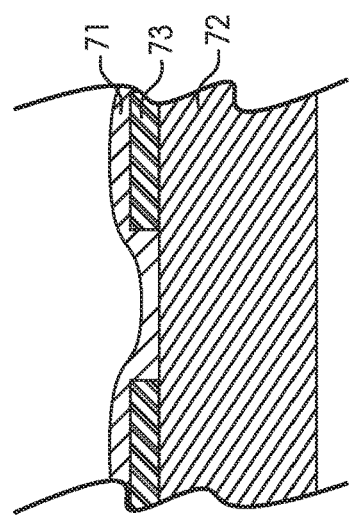
FIG. 14A is a schematic cross-section showing an alternative embodiment for patterning the first and second materials in the electrically conductive layer(s).

FIG. 14 illustrates an exemplary pattern (right column) that may be achieved by patterning a transparent conductive oxide (TCO) layer 73 and a second material 71 having a resistivity at least two orders of magnitude greater than the TCO. In each of these embodiments, the TCO material 73 is deposited on the substrate, patterned and overcoated with the second material 71, the overcoat covering the regions containing the TCO material 73 and the gaps between the regions of TCO material. In the right panel of FIG. 14, the TCO material 73 is interrupted by a series of gaps depicted as lines, with the length of the lines (gaps) decreasing as a function of increasing distance from the top edge.

Figure 15B:
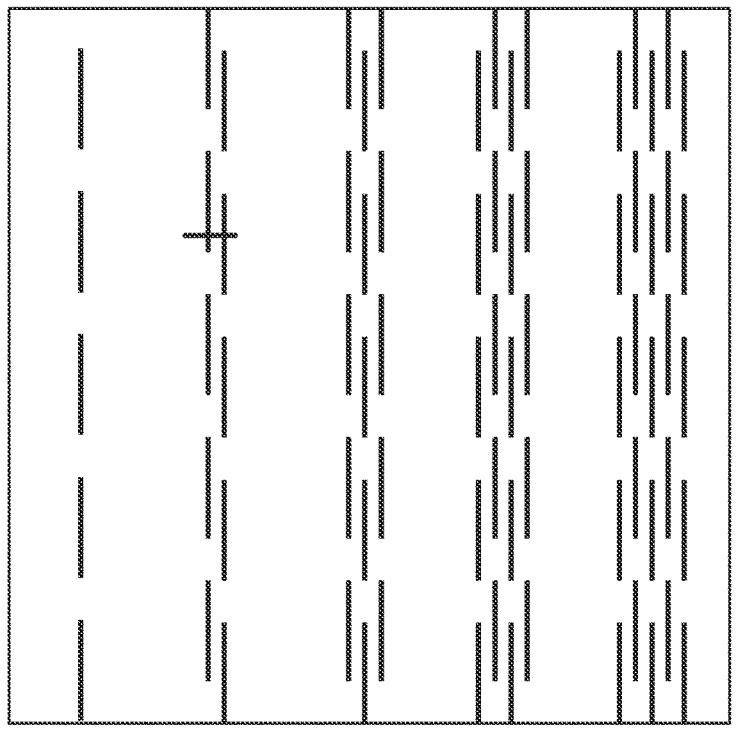
FIG. 15B shows a corresponding exemplary pattern that may be achieved by patterning a transparent conductive oxide (TCO) layer and a second material (resistor) having a resistivity at least two orders of magnitude greater than the TCO.
Figure 15A:
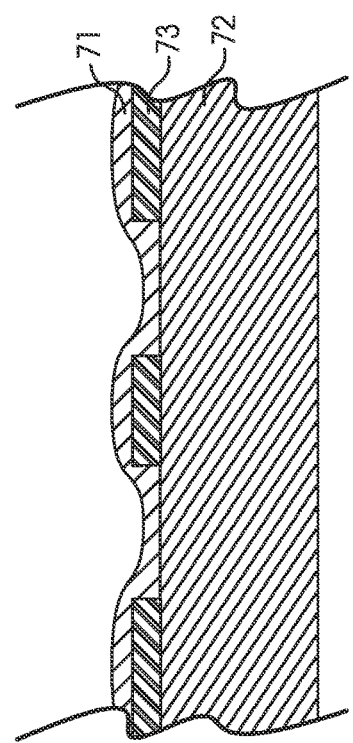
FIG. 15A is a schematic cross-section showing an alternative embodiment for patterning the first and second materials in the electrically conductive layer(s).

FIG. 15 illustrates an exemplary pattern (right column) that may be achieved by patterning a transparent conductive oxide (TCO) layer 73 and a second material 71 having a resistivity at least two orders of magnitude greater than the TCO. In each of these embodiments, the TCO material 73 is deposited on the substrate, patterned and overcoated with the second material 71, the overcoat covering the regions containing the TCO material 73 and the gaps between the regions of TCO material. In the right panel of FIG. 15, the TCO material 73 is interrupted by a series of gaps depicted as lines of approximately equal length, with the number of lines increasing as a function of increasing distance from the top edge.

Referring again to FIG. 1, at least one of first and second electrode layers 20 and 21 is electrochromic, one of the first and second electrode layers is the counter electrode for the other, and first and second electrode layers 20 and 21 are inorganic and/or solid. Non-exclusive examples of electrochromic electrode layers 20 and 21 are cathodically coloring thin films of oxides based on tungsten, molybdenum, niobium, titanium, lead and/or bismuth, or anodically coloring thin films of oxides, hydroxides and/or oxy-hydrides based on nickel, iridium, iron, chromium, cobalt and/or rhodium.

In one embodiment, first electrode layer 20 contains any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_3$), nickel oxide ($Ni_2O_3$), cobalt oxide ($Co_2O_3$) and the like. In some embodiments, the metal oxide is doped with one or more dopants such as lithium, sodium, potassium, molybdenum, vanadium, titanium, and/or other suitable metals or compounds containing metals. Mixed oxides (e.g., W—Mo oxide, W—V oxide) are also used in certain embodiments.

In some embodiments, tungsten oxide or doped tungsten oxide is used for first electrode layer 20. In one embodiment, first electrode layer 20 is electrochromic and is made substantially of $WO_x$, where "x" refers to an atomic ratio of oxygen to tungsten in the electrochromic layer, and x is between about 2.7 and 3.5. It has been suggested that only sub-stoichiometric tungsten oxide exhibits electrochromism; i.e., stoichiometric tungsten oxide, $WO_3$, does not exhibit electrochromism. In a more specific embodiment, $WO_x$, where x is less than 3.0 and at least about 2.7 is used for first electrode layer 20. In another embodiment, first electrode layer 20 is $WO_x$, where x is between about 2.7 and about 2.9. Techniques such as Rutherford Backscattering Spectroscopy (RBS) can identify the total number of oxygen atoms which include those bonded to tungsten and those not bonded to tungsten. In some instances, tungsten oxide layers where x is 3 or greater exhibit electrochromism, presumably due to unbound excess oxygen along with sub-stoichiometric tungsten oxide. In another embodiment, the tungsten oxide layer has stoichiometric or greater oxygen, where x is 3.0 to about 3.5.

In certain embodiments, the electrochromic mixed metal oxide is crystalline, nanocrystalline, or amorphous. In some embodiments, the tungsten oxide is substantially nanocrystalline, with grain sizes, on average, from about 5 nm to 50 nm (or from about 5 nm to 20 nm), as characterized by transmission electron microscopy (TEM). The tungsten oxide morphology may also be characterized as nanocrystalline using x-ray diffraction (XRD); XRD. For example, nanocrystalline electrochromic tungsten oxide may be characterized by the following XRD features: a crystal size of about 10 to 100 nm (e.g., about 55 nm. Further, nanocrystalline tungsten oxide may exhibit limited long range order, e.g., on the order of several (about 5 to 20) tungsten oxide unit cells.

The thickness of the first electrode layer 20 depends on the electrochromic material selected for the electrochromic layer. In some embodiments, first electrode layer 20 is about 50 nm to 2,000 nm, or about 100 nm to 700 nm. In some embodiments, the first electrode layer 20 is about 250 nm to about 500 nm.

Second electrode layer 21 serves as the counter electrode to first electrode layer 20 and, like first electrode layer 20, second electrode layer 21 may comprise electrochromic materials as well as non-electrochromic materials. Non-exclusive examples of second electrode layer 21 are cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films, e.g., of oxides based on vanadium and/or cerium as well as activated carbon. Also combinations of such materials can be used as second electrode layer 21.

In some embodiments, second electrode layer 21 may comprise one or more of a number of different materials that are capable of serving as reservoirs of ions when the electrochromic device is in the bleached state. During an electrochromic transition initiated by, e.g., application of an appropriate electric potential, the counter electrode layer transfers some or all of the ions it holds to the electrochromic first electrode layer 20, changing the electrochromic first electrode layer 20 to the colored state.

In some embodiments, suitable materials for a counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. Optically passive counter electrodes comprise cerium titanium oxide ($CeO_2$—$TiO_2$), cerium zirconium oxide ($CeO_2$—$ZrO_2$), nickel oxide (NiO), nickel-tungsten oxide (NiWO), vanadium oxide ($V_2O_5$), and mixtures of oxides (e.g., a mixture of $Ni_2O_3$ and $WO_3$). Doped formulations of these oxides may also be used, with dopants including, e.g., tantalum and tungsten. Because first electrode layer 20 contains the ions used to produce the electrochromic phenomenon in the electrochromic material when the electrochromic material is in the bleached state, the counter electrode preferably has high transmittance and a neutral color when it holds significant quantities of these ions.

In some embodiments, nickel-tungsten oxide (NiWO) is used in the counter electrode layer. In certain embodiments, the amount of nickel present in the nickel-tungsten oxide can be up to about 90% by weight of the nickel-tungsten oxide. In a specific embodiment, the mass ratio of nickel to tungsten in the nickel-tungsten oxide is between about 4:6 and 6:4 (e.g., about 1:1). In one embodiment, the NiWO is between about 15% (atomic) Ni and about 60% Ni; between about 10% W and about 40% W; and between about 30% 0 and about 75% 0. In another embodiment, the NiWO is between about 30% (atomic) Ni and about 45% Ni; between about 10% W and about 25% W; and between about 35% O and about 50% O. In one embodiment, the NiWO is about 42% (atomic) Ni, about 14% W, and about 44% O.

In some embodiments, the thickness of second electrode layer 21 is about 50 nm about 650 nm. In some embodiments, the thickness of second electrode layer 21 is about 100 nm to about 400 nm, preferably in the range of about 200 nm to 300 nm.

Ion conducting layer 10 serves as a medium through which ions are transported (in the manner of an electrolyte) when the electrochromic device transforms between the bleached state and the colored state. Ion conductor layer 10 comprises an ion conductor material. It may be transparent or non-transparent, colored or non-colored, depending on the application. Preferably, ion conducting layer 10 is highly conductive to the relevant ions for the first and second electrode layers 20 and 21. Depending on the choice of materials, such ions include lithium ions ($Li^+$) and hydrogen ions ($H^+$) (i.e., protons). Other ions may also be employed in certain embodiments. These include deuterium ions ($D^+$), sodium ions ($Na^+$), potassium ions ($K^+$), calcium ions ($Ca^{++}$), barium ions ($Ba^{++}$), strontium ions ($Sr^{++}$), and magnesium ions ($Mg^{++}$). Preferably, ion conducting layer 10 also has sufficiently low electron conductivity that negligible electron transfer takes place during normal operation. In various embodiments, the ion conductor material has an ionic conductivity of between about $10^{-5}$ S/cm and $10^{-3}$ S/cm.

Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI (lithium bis(trifluoromethane) sulfonimide), $LiBF_4$ (lithium tetrafluoroborate), $LiAsF_6$ (lithium hexafluoro arsenate), $LiCF_3SO_3$ (lithium trifluoromethane sulfonate), and $LiCIO_4$ (lithium perchlorate). Additional examples of suitable ion conducting layers include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conducting layer comprises a silicate-based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conducting layer 10 will vary depending on the material. In some embodiments using an inorganic ion conductor the ion conducting layer 10 is about 250 nm to 1 nm thick, preferably about 50 nm to 5 nm thick. In some embodiments using an organic ion conductor, the ion conducting layer is about 100,000 nm to 1,000 nm thick or about 25,000 nm to 10,000 nm thick. The thickness of the ion conducting layer is also substantially uniform. In one embodiment, a substantially uniform ion conducting layer varies by not more than about +/−10% in each of the aforementioned thickness ranges. In another embodiment, a substantially uniform ion conducting layer varies by not more than about +/−5% in each of the aforementioned thickness ranges. In another embodiment, a substantially uniform ion conducting layer varies by not more than about +/−3% in each of the aforementioned thickness ranges.

Referring again to FIG. 1, substrates 24 and 25 have flat surfaces. That is, they have a surface coincides with the tangential plane in each point. Although substrates with flat surfaces are typically employed for electrochromic architectural windows and many other electrochromic devices, it is contemplated that the multi-layer devices of the present invention may have a single or even a doubly curved surface. Stated differently, it is contemplated that each of the layers of stack 28 have a corresponding radius of curvature. See, for example, U.S. Pat. No. 7,808,692 which is incorporated herein by reference in its entirety with respect to the definition of single and doubly curved surfaces and methods for the preparation thereof.

Figure 16:
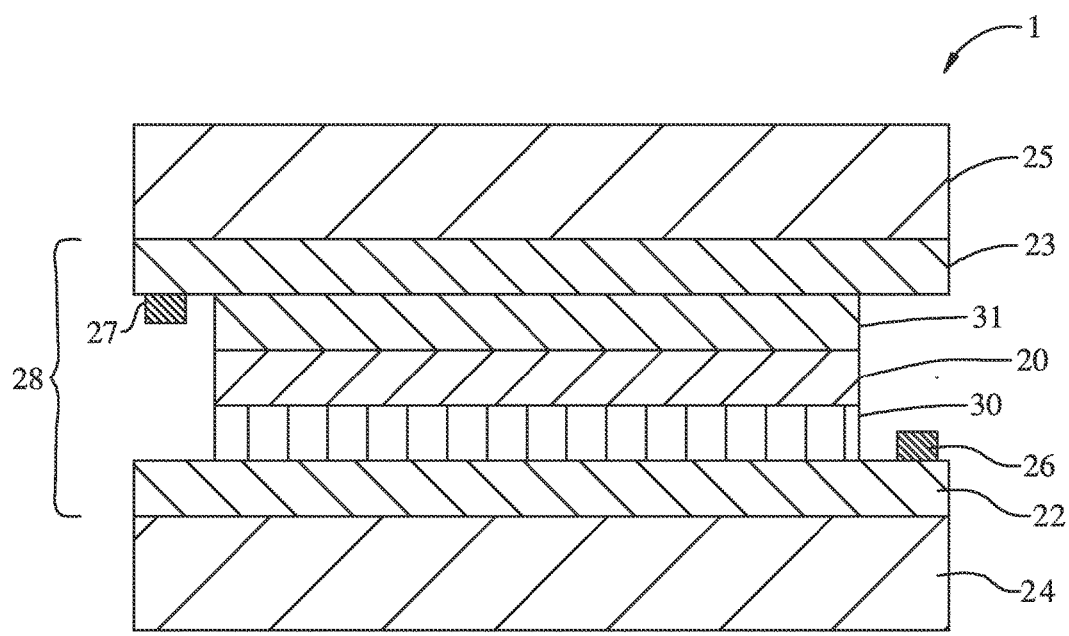
FIG. 16 is a schematic cross-section of an alternative embodiment of a multi-layer electrochromic device of the present invention.

FIG. 16 depicts a cross-sectional structural diagram of an electrochromic device according to a second embodiment of the present invention. Moving outward from the center, electrochromic device 1 comprises electrochromic electrode layer 20. On either side of electrochromic electrode layer 20, in succession, are first and second current modulating structures 30, 31, first and second electrically conductive layers 22, 23 and outer substrates 24, 25, respectively. Elements 22, 20, and 23 are collectively referred to as an electrochromic stack 28. At least one of first and second current modulating structures 30, 31 contains a patterned sublayer in accordance with the present invention. Electrically conductive layer 22 is in electrical contact with a voltage source via bus bar 26 and electrically conductive layer 23 is in electrical contact with a voltage source via bus bar 27 whereby the transmittance of electrochromic device 20 may be changed by applying a voltage pulse to electrically conductive layers 22, 23. The pulse causes a cathodic compound in electrochromic electrode layer 20 to undergo a reversible chemical reduction and an anodic compound in electrochromic electrode layer 20 to undergo a reversible chemical oxidation. Either the cathodic or anodic compound will demonstrate electrochromic behavior such that electrochromic electrode layer 20 becomes less transmissive or more transmissive after the pulse; in one embodiment, electrochromic device 1 has relatively greater transmittance before the voltage pulse and lesser transmittance after the voltage pulse or vice versa.

Figure 17:
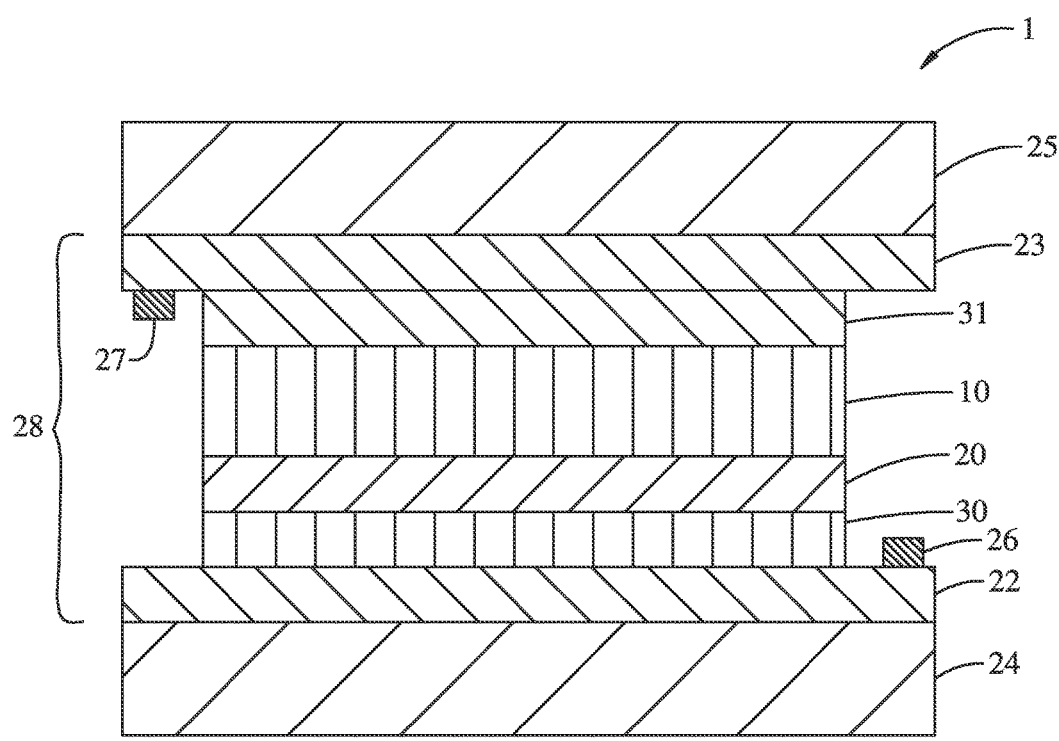
FIG. 17 is a schematic cross-section of an alternative embodiment of a multi-layer electrochromic device of the present invention.

FIG. 17 depicts a cross-sectional structural diagram of an electrochromic device according to a third embodiment of the present invention. Moving outward from the center, electrochromic device 1 comprises ion conductor layer 10. Electrochromic electrode layer 20 is on one side of and in contact with a first surface of ion conductor layer 10. First electrically conductive layer 22 is on one side of electrochromic layer 20 and second electrically conductive layer 23 is on a second, opposing side of ion conductor layer 10. First current modulating structure 30 is between electrochromic electrode layer 20 and electrically conductive layer 22 and second current modulating structure 31 is between ion conductor layer 10 and second electrically conductive layer 23. At least one of first and second current modulating structures 30, 31 contains a patterned sublayer in accordance with the present invention. In one embodiment, first and second current modulating structures 30, 31 each contains a patterned sublayer in accordance with the present invention. In one embodiment, at least one of electrically conductive layers 22, 23 has a non-uniform sheet resistance as a function of position. By way of further example, in another embodiment one of first and second electrically conductive layers 22, 23 contains a patterned conductive sublayer and has a non-uniform sheet resistance as a function of position and the other is a non-patterned layer having a non-uniform sheet resistance as a function of position. By way of further example, in another embodiment first and second electrically conductive layers 22, 23 each have a non-uniform sheet resistance as a function of position. The first and second electrically conductive layers 22, 23 are arranged against outer substrates 24, 25. Elements 10, 20, 22 and 23 are collectively referred to as electrochromic stack 28. Electrically conductive layer 22 is in electrical contact with a voltage source (not shown) via bus bar 26 and electrically conductive layer 23 is in electrical contact with a voltage source (not shown) via bus bar 27 whereby the transmittance of electrochromic layer 20 may be changed by applying a voltage pulse to electrically conductive layers 22, 23. Ion conductor layer 10 comprises a species that is capable of reversibly oxidizing or reducing upon the insertion or withdrawal of electrons or ions and this species may also be electrochromically active. The voltage pulse causes electrons and ions to move between first electrode layer 20 and ion conducting layer 10 and, as a result, electrochromic materials in the electrode layer 20 changes color, thereby making electrochromic device 1 less transmissive or more transmissive. In one embodiment, electrochromic device 1 has relatively greater transmittance before the voltage pulse and relatively lesser transmittance after the voltage pulse or vice versa.

In general, the composition and sheet resistance profiles for first and second electrically conductive layers 22, 23, 22, 23 are as previously described in connection with FIG. 1. Electrochromic electrode layers 20 and 20 may, for example, contain an electrochromic material, either as a solid film or dispersed in an electrolyte, the electrochromic material being selected from among inorganic metal oxides such as tungsten trioxide ($WO_3$), nickel oxide (NiO) and titanium dioxide ($TiO_2$), and organic electrochromic materials including bipyridinium salt (viologen) derivatives, N,N'-di(p-cyanophenyl) 4,4'-bipyridilium (CPQ), quinone derivatives such as anthraquinone and azine derivatives such as phenothiazine.

Figure 18:
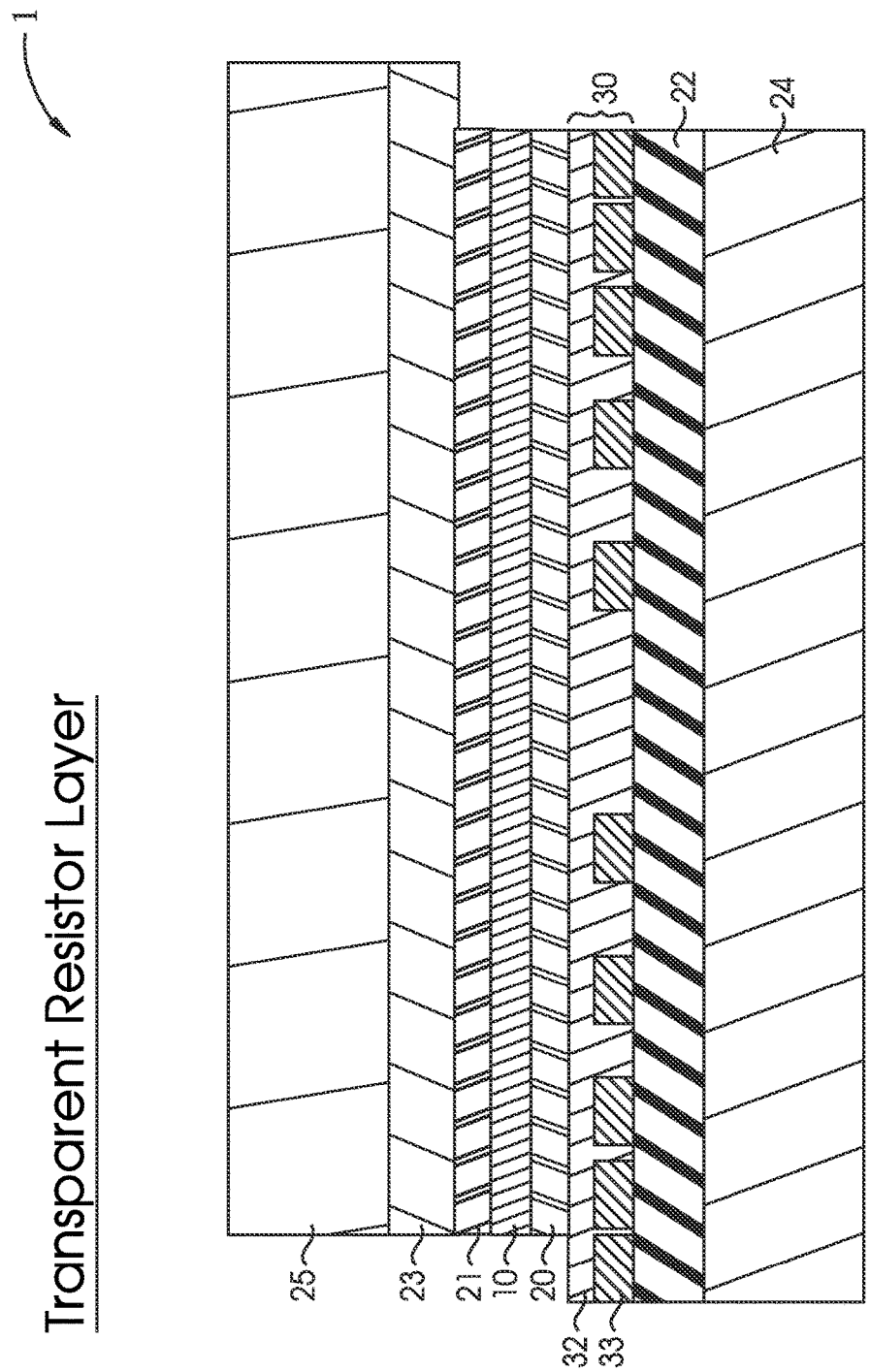
FIG. 18 is a schematic cross-section of an alternative embodiment of the electrochromic device of the present invention.

FIG. 18 illustrates one alternative embodiment of the present invention. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. The central structure, that is, layers 20, 10, 21, is positioned between first and second electrically conductive layers 22 and 23 which, in turn, are arranged against outer substrates 24, 25. In addition, electrochromic device 1 comprises current modulating structure 30 between first electrically conductive layer 22 and first electrode 20. Current modulating structure 30 comprises first material 32 (e.g., a resistive material) and second material 33 having a resistivity at least two orders of magnitude greater than the first material. In one further embodiment, electrochromic device 1 may additionally contain a second current modulating structure 31 (not shown) between second electrode layer 21 and second electrically conductive layer 23; in one such embodiment, the second current modulating structure may have a uniform or non-uniform cross-layer resistance as a function of position and, if non-uniform, the second current modulating structure may optionally contained a patterned sublayer comparable to first current modulating structure 30.

Figure 19:
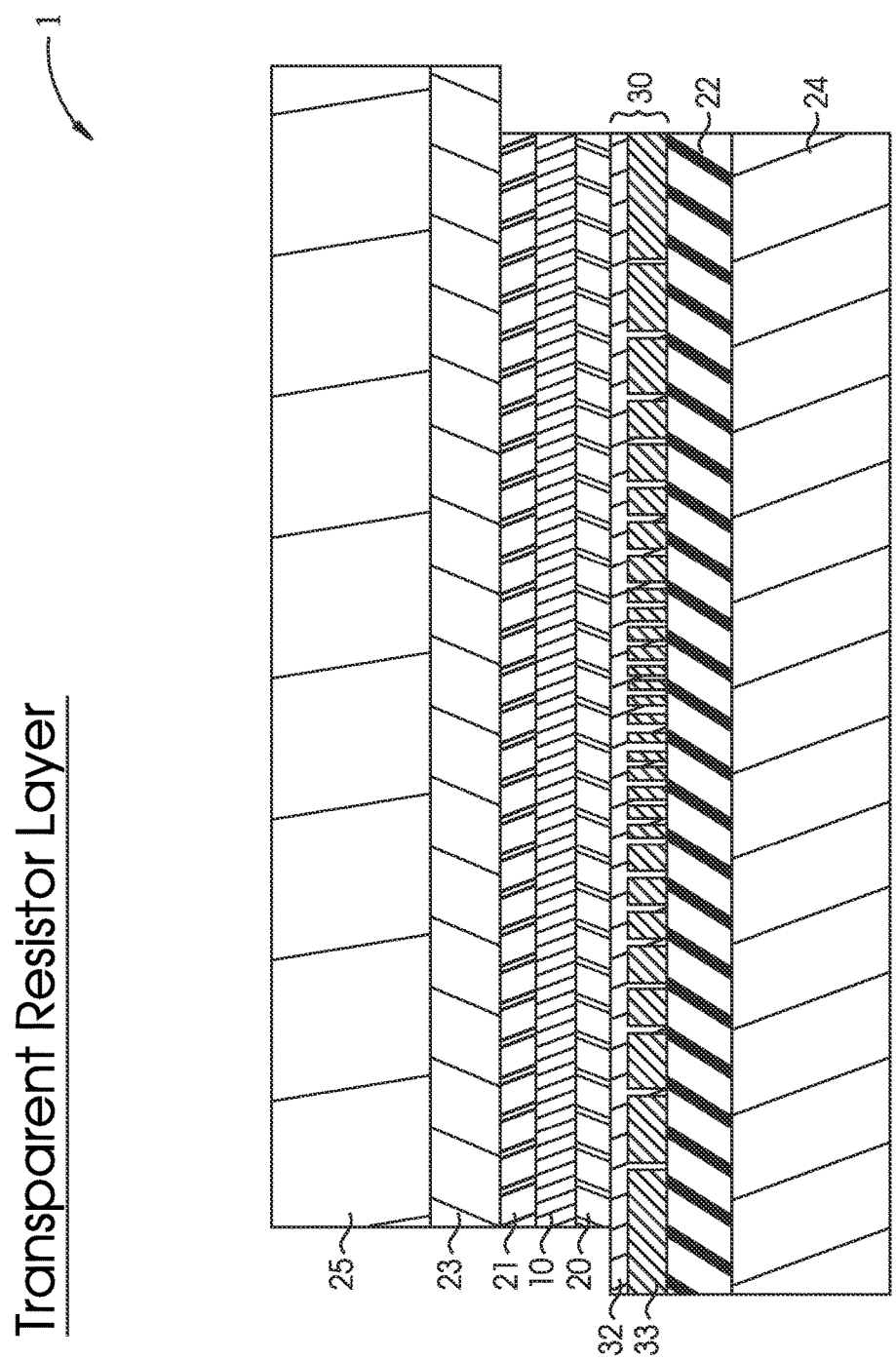
FIG. 19 is a schematic cross-section of an alternative embodiment of the electrochromic device of the present invention.

FIG. 19 illustrates one alternative embodiment of the present invention. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. The central structure, that is, layers 20, 10, 21, is positioned between first and second electrically conductive layers 22 and 23 which, in turn, are arranged against outer substrates 24, 25. In addition, electrochromic device 1 comprises current modulating structure 30 between first electrically conductive layer 22 and first electrode 20. Current modulating structure 30 comprises first material 32 (e.g., a resistive material) and second material 33 having a resistivity at least two orders of magnitude greater than the first material. In one further embodiment, electrochromic device 1 may additionally contain a second current modulating structure 31 (not shown) between second electrode layer 21 and second electrically conductive layer 23; in one such embodiment, the second current modulating structure may have a uniform or non-uniform cross-layer resistance as a function of position and, if non-uniform, the second current modulating structure may optionally contained a patterned sublayer comparable to first current modulating structure 30.

Figure 20:
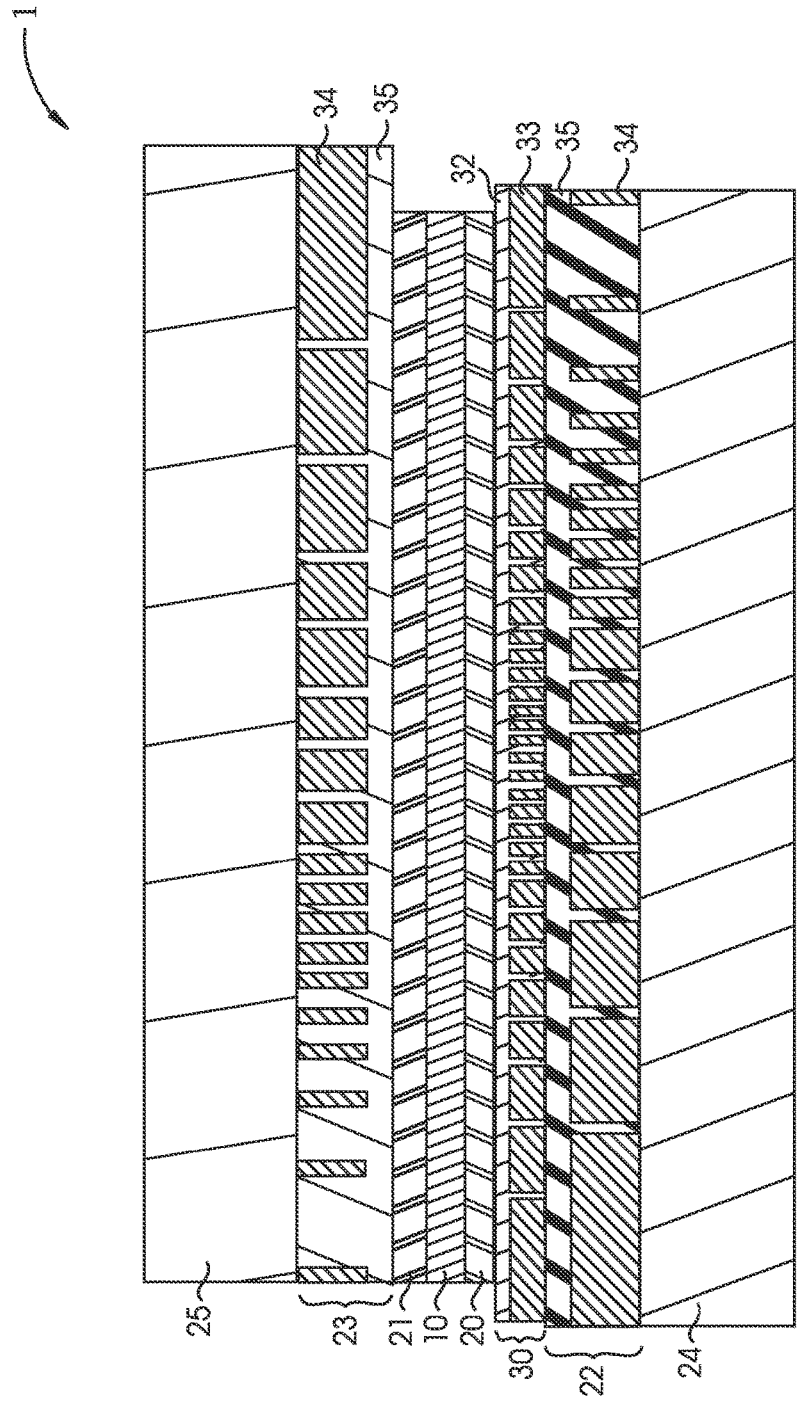
FIG. 20 is a schematic cross-section of an alternative embodiment of the electrochromic device of the present invention.

FIG. 20 illustrates one alternative embodiment of the present invention. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. The central structure, that is, layers 20, 10, 21, is positioned between first and second electrically conductive layers 22 and 23 which, in turn, are arranged against outer substrates 24, 25. Each of first and second electrically conductive layers 22 and 23 are patterned layers comprising first material 34 (e.g., a transparent conductive oxide) and second material 35 having a resistivity at least two orders of magnitude greater than the first material. Each of first and second electrically conductive layers 22 and 23, in turn, are arranged against outer substrates 24, 25. In addition, electrochromic device 1 comprises current modulating structure 30 between first electrically conductive layer 22 and first electrode 20. Current modulating structure 30 comprises first material 32 (e.g., a resistive material) and second material 33 having a resistivity at least two orders of magnitude greater than the first material. In one further embodiment, electrochromic device 1 may additionally contain a second current modulating structure 31 (not shown) between second electrode layer 21 and second electrically conductive layer 23; in one such embodiment, the second current modulating structure may have a uniform or non-uniform cross-layer resistance as a function of position and, if non-uniform, the second current modulating structure may optionally contained a patterned sublayer comparable to first current modulating structure 30.

Figure 21:
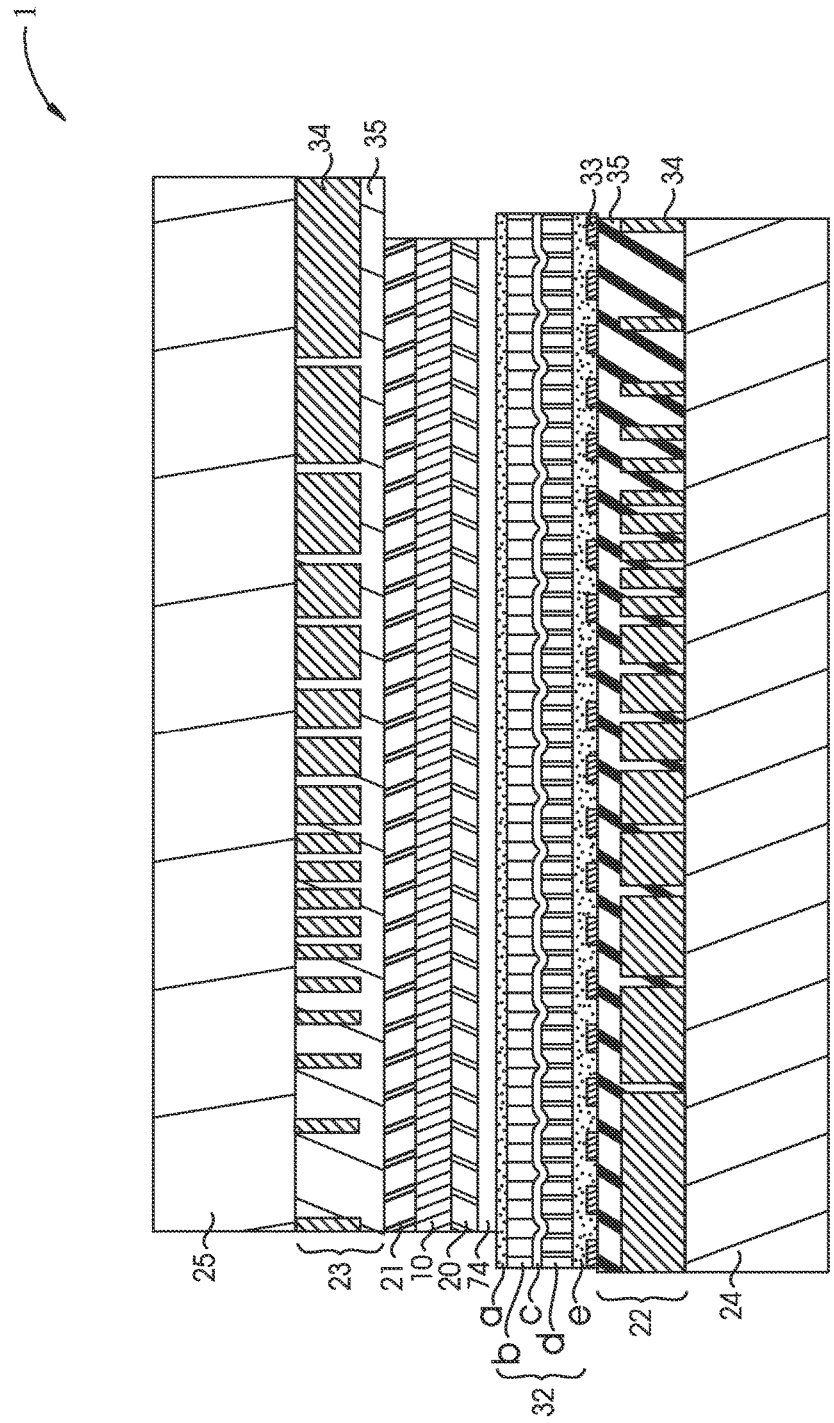
FIG. 21 is a schematic cross-section of an alternative embodiment of the electrochromic device of the present invention.

Referring now to FIG. 21, in a further alternative embodiment, first material 32 (of electrochromic device 1 illustrated in FIG. 20) is subdivided into a multi-layer composite comprising sublayers a, b, c, d, and e in order to minimize conductive defects that may shunt layer 22 to layer 20, and to improve the ohmic contact between first material 32 and first electrode 20, and between first material 32 and first electrically conductive layer 22. Layers a and e function as conduction band coupling layers that improve the ohmic contact between first electrically conductive layer 22 and layer d, and between layer b and electrical potential smoothing layer 74, respectively. Layer c is a defect mitigation layer, separating layers b and d, each of which comprises a resistive material (as previously described in connection with first material 32). For example, in one embodiment layer c may be an ALD (atomic layer deposition) film of $Al_2O_3HfO_2$, HfSiO, $La_2O_3$, $SiO_2$, STO, $Ta_2O_5$, $TiO_2$, ZnO or similar insulating or resistive materials. Layers a and e may be a metal, an oxide or a nitride material that has a conduction band energy which is between the conduction band energy of first electrically conductive layer 22 and layer d, and between electrical potential smoothing layer 74 and layer b, respectively, such as an oxide or nitride with a conduction band energy between 3.5 and 5 eV, such as $SnO_2$, ZnO, $TiO_2$, $ZrO_2$.

In certain embodiments, the patterning of the first and second materials in current modulating structure 30 and/or 31 may cause a significant local variation in the electrical potential at the surface(s) thereof. Still referring to FIG. 21, this local variation in electrical potential may be reduced, for example, by incorporating an electrical potential smoothing layer 74 between first electrode layer 20 and current modulating structure 30. Electrical potential smoothing layer 74 may comprise a thin layer of ITO, AZO, IZO or other transparent conductive material. Preferably, the thickness and conductivity of the electrical potential smoothing layer 74 does not significantly affect the overall cross-layer resistance. For example, in one embodiment the smoothing layer is a 10 nm thick sputtered film of ITO.

Figure 22:
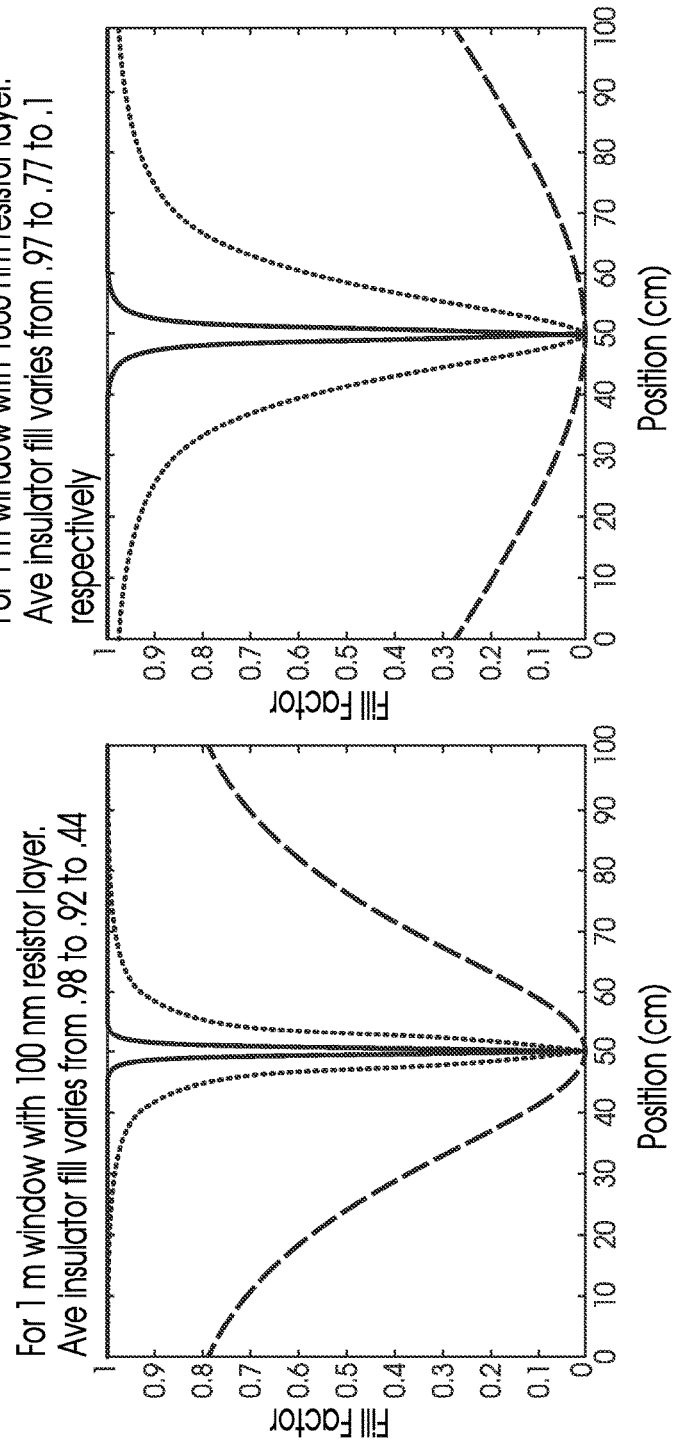
FIG. 22 shows two line graphs depicting insulator fill factors as a function of position (cm).

For exemplification purposes, FIG. 22 graphically correlates fill factors required to achieve uniform switching for a range of resistor material resistivities ($10^5$, $10^7$, and $10^9$ $\Omega$cm) and two different current modulating structure (composite layer) thicknesses as a function of position in a device having a surface area of 1 $m^2$. In this context, a "fill factor" is defined as the local fraction of the area that comprises insulating material. For example, a fill factor of one (1) indicates that there are no holes in the insulator material, a fill factor of 0.5 correlates to a layer that is half-insulator and half-resistor, and a layer with a fill factor of zero (0) has only resistive material with no insulator material present locally in the layer.

Figure 23:
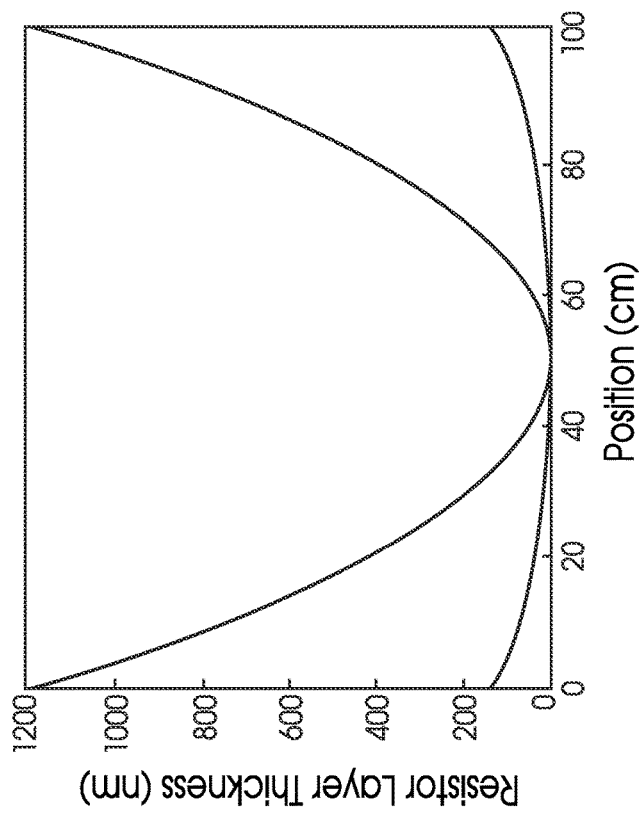
FIG. 23 is a line graph depicting resistor layer thickness (nm) as a function of position (cm).

For exemplification purposes, FIG. 23 graphically correlates the resistor layer thickness required in a current modulating structure to compensate two different electrically conductive (e.g., TCO) layers having a non-uniform sheet resistance where the electrically conductive layer (TCO layer) has a functional form of sheet resistance as ax+b, where x is the location in the film on a substrate of size L. The shallower curve corresponds to the case where a*L is much larger than b and the steeper curve corresponds to the case where a*L is not much larger than b.

In operation, to switch an electrochromic device of the present invention from a first to a second optical state having differing transmissivities, i.e., from a state of relatively greater transmissivity to a state of lesser transmissivity or vice versa, a voltage pulse is applied to the electrical contacts/bus bars on the device. Once switched, the second optical state will persist for some time after the voltage pulse has ended and even in the absence of any applied voltage; for example, the second optical state will persist for at least 1 second after the voltage pulse has ended and even in the absence of any applied voltage. By way of further example, the second optical state may persist for at least 5 seconds after the voltage pulse has ended and even in the absence of any applied voltage. By way of further example, the second optical state may persist for at least 1 minute after the voltage pulse has ended and even in the absence of any applied voltage. By way of further example, the second optical state may persist for at least 1 hour after the voltage pulse has ended and even in the absence of any applied voltage. The device may then be returned from the second optical state to the first optical state by reversing the polarity and applying a second voltage pulse and, upon being switched back, the first optical state will persist for some time after the second pulse has ended even in the absence of any applied voltage; for example, the first optical state will persist for at least 1 second after the voltage pulse has ended and even in the absence of any applied voltage. By way of further example, the first optical state may persist for at least 1 minute after the voltage pulse has ended and even in the absence of any applied voltage. By way of further example, the first optical state may persist for at least 1 hour after the voltage pulse has ended and even in the absence of any applied voltage. This process of reversibly switching from a first persistent to a second persistent optical state, and then back again, can be repeated many times and practically indefinitely.

In some embodiments the waveform of the voltage pulse may be designed so that the local voltage across the electrochromic stack never exceeds a predetermined level; this may be preferred, for example, in certain electrochromic devices where excessive voltage across the electrochromic stack can damage the device and/or induce undesirable changes to the electrochromic materials.

Advantageously, the non-uniform sheet resistance of the first and/or second electrically conductive layers of the multi-layer devices of the present invention may permit greater tolerances with respect to the magnitude and/or duration of the voltage pulse. As a result, the local voltage across the electrochromic stack may be significantly less than the voltage applied across the entire device because of the voltage drop in the electrically conductive layer(s). For example, in one embodiment, the applied potential across the electrochromic stack has a magnitude of at least 2 Volts. By way of further example, the voltage pulse may have a magnitude of at least 3 Volts. By way of further example, the voltage pulse may have a magnitude of at least 4 Volts. By way of further example, the voltage pulse may have a magnitude of at least 5 Volts. By way of further example, the voltage pulse may have a magnitude of at least 6 Volts. By way of further example, the voltage pulse may have a magnitude of at least 7 Volts. By way of further example, the voltage pulse may have a magnitude of at least 8 Volts. By way of further example, the voltage pulse may have a magnitude of at least 9 Volts. By way of further example, the voltage pulse may have a magnitude of at least 10 Volts. By way of further example, the voltage pulse may have a magnitude of at least 11 Volts. By way of further example, the voltage pulse may have a magnitude of at least 12 Volts. By way of further example, the voltage pulse may have a magnitude of at least 13 Volts. By way of further example, the voltage pulse may have a magnitude of at least 14 Volts. By way of further example, the voltage pulse may have a magnitude of at least 15 Volts. By way of further example, the voltage pulse may have a magnitude of at least 16 Volts. By way of further example, the voltage pulse may have a magnitude of at least 18 Volts. By way of further example, the voltage pulse may have a magnitude of at least 20 Volts. By way of further example, the voltage pulse may have a magnitude of at least 22 Volts. By way of further example, the voltage pulse may have a magnitude of at least 24 Volts. In general, such potentials may be applied for a relatively long period of time. For example, a potential having a magnitude of any of such values may be applied for a period of at least 1 seconds. By way of further example, a potential having a magnitude of any of such values may be applied for a period of at least 10 seconds. By way of further example, a potential having a magnitude of any of such values may be applied for a period of at least 20 seconds. By way of further example, a potential having a magnitude of any of such values may be applied for a period of at least 40 seconds.

To illustrate for one specific exemplary embodiment, a voltage pulse of 16 volts may be applied across an electrochromic stack incorporating two TCO electrically conductive layers having non-uniform sheet resistance and a bus bar located at opposite perimeter edges of the entire device. The voltage pulse rises quick to allow the local voltage drop across the layers to quickly ramp to 1.0 volts and maintain that voltage until the device switching approaches completeness at which point the device layers begin to charge up and the current drops. Because of the gradient and sheet resistance in the electrically conductive layers the voltage drop across the device is constant across the device and in addition, there is a voltage drop across each of the electrically conductive layers of the device. The voltage drops through the non-uniform resistivity electrically conductive layers enables a voltage significantly larger than the maximum operating voltage of the device stack to be applied across the entire assembly and maintain a local voltage across the device stack below a desired value. As the device charging takes place, the applied voltage is dropped to keep the local voltage across the device layers at 1.0 volts. The voltage pulse will drop to a steady state value close to 1 volt if it is desired to keep a steady state 1.0 volts across the local device thickness or alternatively the voltage pulse will drop to zero volts if it is desired to keep no voltage across the local device thickness in steady state.

To change the optical state of a multilayer device to an intermediate state, a voltage pulse is applied to the electrical contacts/bus bars on the device. This shape of this voltage pulse would typically be device specific and depend on the intermediate state desired. The intermediate state can be defined in terms of a total charge moved, charge state of device, or an optical measurement of the device. By using non-uniform electron conductor layers to apply uniform local voltages across the device layers this provides a unique advantage for rapid large area intermediate state control using optical state feedback since a local optical measurement of the device state near the edge will be representative of the entire device at all times (no iris effect). Also by using non-uniform electron conductor layers to apply uniform local voltages across the device layers this provides a unique advantage for rapid large area intermediate state control using voltage feedback since the voltage state at the bus bars will be representative of the entire device rather than an average across a non-uniformly colored device (again no iris effect). In a specific example, a voltage pulse of 32 volts is applied across an electrochromic device incorporating two gradient TCO layers and a bus bar located at opposite perimeter edges of the entire device. The voltage pulse rises quick to allow the local voltage drop across the layers to quickly ramp to 1.0 volts and maintain that voltage until the device reaches a desired optical state measured with an appropriate optical sensor at which point the voltage pulse quickly ramps down to zero or to a desired steady state voltage.

One further advantage of the non-uniform resistance electrochromic devices proposed herein, whether those comprising electrically conductive layers with non-uniform sheet resistance and/or those comprising current modulating structures with non-uniform cross-layer resistance is that the control scheme used to drive and/or switch such non-uniform resistance electrochromic devices can be greatly simplified. For example, the control scheme may comprise a current driven mode where a predetermined current is input to the electrochromic device for a predetermined time based on the charge capacity of the electrochromic device, the desired switching speed, and/or the target end state for the electrochromic device. For non-uniform resistance electrochromic devices, the non-uniform resistance thereof can make the voltage drop across the device substantially constant, such that the optical state of such non-uniform resistance electrochromic devices can be switched uniformly across their entire area if desired. Accordingly, because of such switching uniformity, the optical state of the non-uniform resistance electrochromic device can be controlled, predicted, and/or extrapolated with great precision across the entire area of the electrochromic device by implementing simple current driving schemes, such as via a constant current voltage driven mode.

For instance, a non-uniform resistance electrochromic device may comprise a charge capacity requiring a charge density or total charge $Q_{TOT}$ to fully switch optical states between a bleached state and an opaque or colored state. In some embodiments, the non-uniform resistance electrochromic device may comprise or be similar to one or more of the non-uniform resistance devices shown or discussed with respect to the figures, description, or embodiments disclosed herein. To switch the non-uniform resistance electrochromic device to a target optical state, a target charge $Q_{TGT}$ for the non-uniform resistance electrochromic device can be calculated such that the ratio between target charge $Q_{TGT}$ and total charge $Q_{TOT}$ reflects the target optical state. For instance, in one example, $Q_{TGT}$ can be selected to be substantially equal to $Q_{TOT}$ for establishing a maximum opacity or minimally bleached optical state, and/or $Q_{TGT}$ can be selected to be at or approximately zero for establishing a minimal opacity or maximum bleach optical state. In a different example, $Q_{TGT}$ can be selected to be substantially equal to $Q_{TOT}$ for establishing a minimum opacity or maximum bleached optical state, and/or $Q_{TGT}$ can be selected to be at or approximately zero for establishing a maximum opacity or minimal bleach optical state.

To switch the non-uniform resistance electrochromic device to the target optical state within a target switching time $T_{TGT}$, a drive current $I_{DRV}$ could be calculated ($I_{DRV}=Q_{TGT}/T_{TGT}$) and fed to the non-uniform resistance electrochromic device to satisfy the desired switching and time requirements, with the expectation that the non-uniform resistance electrochromic device will uniformly achieve the target optical state at the end of target time $T_{TGT}$ and throughout the entire area of the non-uniform resistance electrochromic device. In some examples, drive current $I_{DRV}$ can simply be a constant current. If a full switch between bleached and opaque states is not desired, the drive current $I_{DRV}$ can be adjusted accordingly. For example, to achieve a 50% switch between the bleached and opaque optical states, target charge $Q_{TGT}$ can be set to 50% of total charge $Q_{TOT}$. Accordingly, to satisfy $Q_{TGT}=(I_{DRV})(T_{TGT})$, either drive current $I_{DRV}$ can be decreased by 50%, or time T can be decreased by 50%, with the expectation that the non-uniform resistance electrochromic device will uniformly achieve a 50% opacity optical state at the end of time T and throughout the entire area of the non-uniform resistance electrochromic device. Such simplicity and predictability contrasts with prior art electrochromic devices, avoiding the need to worry about iris effect and the unpredictability it introduces as to the optical state of different portions of the electrochromic device, and avoiding the need for complicated driving schemes attempting to compensate for the switching non-uniformity of such prior art electrochromic devices.

Figure 24:
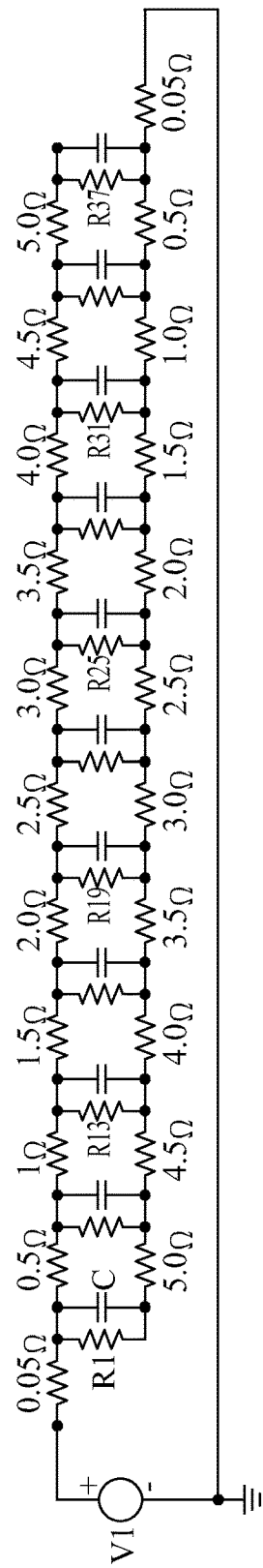
FIG. 24 is a 1-D lumped element circuit model diagram used to simulate dynamic behavior of an electrochromic device of the present invention.

To test the simplified control scheme described above, an experimental setup of the above simplified current driven mode scheme was implemented for a test non-uniform resistance electronic device. The test device had glass substrates that were 9 cm wide by 70 cm long. The electrically conductive layers on these substrates were designed with opposing resistivity gradients for uniform switching along the entire length of the test device, such as described above with respect to device 1 of FIG. 1 and/or the circuit model of FIG. 24. The test device had a first busbar coupled a first electrically conductive layer of the test device, and a second busbar coupled to a second electrically conductive layer of the test device, where the busbars were located at opposite ends of the length of the test device. The busbars were coupled to power source in the form of a Keithley 2,400 sourcemeter from Keithley Instruments, Inc. of Cleveland, Ohio, which was configured to output drive current $I_{DRV}$ to the busbars. A data acquisition (DAQ) unit was also coupled to the test device to measure voltage at the longitudinal center and longitudinal edges of the anode and cathode electrically conductive layers electrically conductive layers to measure the difference between anode and cathode voltages at such locations. The charge capacity of the test device was of 5 Coulombs, such that a charge density $Q_{TOT}$ of 5 Coulombs would be necessary to fully switch the optical state of the test device between bleached and opaque states. Accordingly, for a desired target switching time $T_{TGT}$ of 250 seconds to go from completely bleached to completely opaque, a drive current $I_{DRV}$ of 20 mA would be needed from the power source to establish the needed current driven mode for the test device. The power source was thus configured to deliver the $I_{DRV}$ of 20 mA as a constant current to the busbars of the test device and, at the end of the switching time T of 250 seconds, the test device had fully and uniformly switched its optical state to fully opaque in accordance with the predicted calculation. In addition, the DAQ confirmed that the local device voltages at the longitudinal edges and center of the test device were similar to each other.

A similar test was performed for switching the test device to an intermediate optical state. For example, to switch the test device to a target optical state of 50% opacity, $Q_{TGT}$ was calculated to be 2.5 Coulombs (50% of $Q_{TOT}$). To achieve 2.5 Coulombs=$Q_{TGT}=(I_{DRV})(T)$, $I_{DRV}$ was reduced by 50% to 10 mA while leaving target time $T_{TGT}$ at 250 seconds. As another test, to achieve 2.5 Coulombs=$Q_{TGT}$, $T_{TGT}$ was reduced to 125 seconds while leaving $I_{DRV}$ at 20 mA. Other suitable combinations of $I_{DRV}$ and $T_{TGT}$ can also be combined to achieve the desired target charge of $Q_{TGT}$ in the same or other implementations.

As part of the experimental setups above, local voltages were monitored at different locations of the test device was to ensure that such local voltages would remain within a safe operating window to prevent damage to the test device. For example, if the drive current were too aggressive in an attempt to switch the optical state of the device too quickly, an overdrive situation may ensue where local voltage would exceed the operational limits at certain locations of the electrochromic device. As an example, prior art uniform resistivity electrochromic devices tend to experience voltage overdrive conditions at the edges thereof, such as near the busbars, while the center and other locations away from the edges remain within a safe operating voltage window. Accordingly, for uniform resistivity electrochromic devices, voltage overdrive is best monitored towards the edges and/or near the busbars of such devices. In contrast, for non-uniform resistance electrochromic devices, voltage overdrive may be monitored elsewhere, such as at the center of the device and/or at a point of least resistance between the cathode and anode of the device. In any event, the simplified control scheme for gradient resistance electrochromic devices described above may be configured with a safety feature for switching from the described current driven mode to a voltage driven mode when approaching a voltage overdrive condition, where the voltage driven mode decreases the drive current $I_{DRV}$ such as not to exceed a maximum voltage (Vmax) or minimum voltage (Vmin) limit at the device location being monitored.

Having described the invention in detail, it will be apparent that modifications and variations are possible without departing the scope of the invention defined in the appended claims. Furthermore, it should be appreciated that the examples in the present disclosure are provided as non-limiting examples.

EXAMPLE

A current modulating layer was fabricated on the surface of an electrically conductive layer of Fluorine doped Tin Oxide (FTO) to produce a parabolic cross-layer resistance profile in a direction parallel to one of the sample sides.

The substrate material used for this example was 90 mm by 137 mm Pilkington TEC250 (FTO coated soda lime glass) having a sheet resistance of 250Ω/□. The substrate was first cleaned using a 1% solution of Alcanox in water, rinsed with deionized water and isopropyl alcohol, then sputter-coated with a 50 nm, uniform film of insulating $SiO_2$. The substrate was then coated with a polymeric positive photoresist, and developed under UV using a photomask purchased from Photo Sciences, Inc. The pattern developed is illustrated schematically on FIG. 2D. The black areas represent areas where the photoresist was developed and removed from the silica coating. The boxes were arranged according to a 1 mm pitch array. The area of the boxes increased parabolically as a function of position in the 137 mm direction, from 10 um$^2$ on both edge to 1 mm$^2$ in the center. A physical plasma etch was used in order to remove the silica coating off the FTO in the developed boxes. After the plasma etch, the photoresist was stripped off and the sample cleaned a second time before being coated with $TiO_2$.

The $TiO_2$ was coated using a sol-gel process. The sol-gel precursor was prepared in 1-Butanol with titanium isopropoxide and acetylacetone, both having a concentration in solution of 0.4 mol/L. After spin-coating the solution at 1,500 rpm for 1 minute, the substrate was calcined to 400 C for 1 hour. The thickness of the $TiO_2$ was measured using a dektak profilometer to be around 80 nm. The resulting composite is a current modulating layer where electrons must flow through the apertures in the $SiO_2$ coating (which vary in size with respect to position) and through the $TiO_2$ coating before reaching the surface of the composite stack.

What is claimed is:

1. A multi-layer device, comprising:
   a first substrate comprising a surface, and;
   a first patterned composite electrically conductive layer on the surface of the first substrate, the first patterned composite electrically conductive layer comprising:
   a first patterned conductive layer; and
   a first transparent conductive material layer, wherein the first patterned composite electrically conductive layer comprises a spatially varying resistance to current flow substantially parallel to a major surface of the first patterned electrically conductive layer that varies as a function of position in the first composite electrically conductive layer.

2. The multi-layer device of claim 1, wherein the first patterned conductive layer comprises indium tin oxide and the first transparent conductive material layer comprises doped tin oxide.

3. The multi-layer device of claim 1, wherein a ratio of the resistance to current flow substantially parallel to a major surface of the first patterned composite electrically conductive layer in a first region of the first patterned composite electrically conductive layer circumscribed by a first convex polygon to the resistance to current flow substantially parallel to the major surface of the first patterned composite electrically conductive layer in a second region of the first patterned composite conductive layer circumscribed by a second convex polygon is at least 2, the first and second regions circumscribed by the first and second convex polygons, respectively, each comprising at least 25% of the major surface of the first patterned composite electrically conductive layer.

4. The multi-layer device of claim 1, wherein the first patterned conductive layer comprises a constant thickness and constant resistivity film comprising a laser patterned series of scribes.

5. The multi-layer device of claim 1, further comprising a second substrate and a second patterned composite electrically conductive layer on a surface of the second substrate, the second patterned composite electrically conductive layer being transmissive to electromagnetic radiation having a wavelength in the range of infrared to ultraviolet, the second patterned composite electrically conductive layer comprising:
   a second patterned conductive layer; and
   a second transparent conductive material layer, wherein the second patterned composite electrically conductive layer comprises a spatially varying resistance to current flow substantially parallel to a major surface of the second patterned electrically conductive layer that varies as a function of position in the second composite electrically conductive layer.

6. The multi-layer stack of claim 5, wherein the second patterned conductive layer comprises indium tin oxide and the second transparent conductive material comprises doped tin oxide.

7. The multi-layer device of claim 5, wherein a ratio of the resistance to current flow substantially parallel to a major surface of the second patterned composite electrically conductive layer in a first region of the second patterned composite electrically conductive layer circumscribed by a first convex polygon to the resistance to current flow substantially parallel to a major surface of the second patterned composite electrically conductive layer in a second region of the second patterned composite conductive layer circumscribed by a second convex polygon is at least 2, the first and second regions circumscribed by the first and second convex polygons, respectively, each comprising at least 25% of the major surface of the second patterned composite electrically conductive layer.

8. The multi-layer device of claim 5, wherein the second patterned conductive layer comprises a constant thickness and constant resistivity film having a series of laser scribes.

9. The multi-layer device of claim 5, wherein the spatially varying resistance to current flow substantially parallel to the major surfaces of the first and second electrically conductive layers provides a uniform potential drop, or a desired non-uniform potential drop, across the area of the device.

10. The multi-layer device of claim 5, further comprising:
    a first electrode layer in electrical contact with the first patterned composite electrically conductive layer;
    a second electrode layer in electrical contact with the second patterned composite electrically conductive layer; and
    an ion conductor,
    wherein the first electrode layer is on one side of and in contact with a first surface of the ion conductor layer, and the second electrode layer is on the other side of and in contact with a second surface of the ion conductor layer.

11. The multi-layer device of claim 10, wherein the first or second electrode layer comprises an electrochromic material comprising cathodically coloring thin films comprising oxides based on tungsten, molybdenum, niobium, titanium, lead, bismuth, or combinations thereof, or anodically coloring thin films comprising oxides, hydroxides or oxy-hydrides based on nickel, iridium, iron, chromium, cobalt, rhodium, or combinations thereof.

12. The multi-layer device of claim 10, wherein the first or second electrode layer comprises an electrochromic material comprising tungsten oxide, molybdenum oxide, niobium oxide, titanium oxide, copper oxide, iridium oxide, chromium oxide, manganese oxide, vanadium oxide, nickel oxide, cobalt oxide, or combinations thereof.

13. The multi-layer device of claim 11, wherein the first or second electrode layer further comprises one or more dopants comprising lithium, sodium, potassium, molybdenum, vanadium, titanium, or combinations thereof.

14. A method for the preparation of a multi-layer device, comprising:
forming a first patterned composite electrically conductive layer arranged against a first substrate;
forming a first electrode layer in electrical contact with the first patterned composite electrically conductive layer;
forming a second patterned composite electrically conductive layer on a second substrate;
forming a second electrode layer in electrical contact with the second patterned composite electrically conductive layer;
wherein patterns are introduced into the first and second composite electrically conductive layers by laser patterning a series of scribes into constant thickness and constant resistivity films, the first and second patterned composite electrically conductive layers comprising spatially varying resistance to current flow substantially parallel to a major surface of the first and second patterned electrically conductive layers that varies as a function of position in the first and second composite electrically conductive layers, and wherein the first and second electrode layers comprise electrochromic materials.

15. The method of claim 14, wherein the first and second patterned composite electrically conductive layers comprise indium tin oxide and a transparent conductive material comprising doped tin oxide.

16. The method of claim 14, wherein a ratio of the resistance to current flow substantially parallel to the major surface of the first patterned composite electrically conductive layer in a first region of the first patterned composite electrically conductive layer circumscribed by a first convex polygon to the resistance to current flow substantially parallel to a major surface of the first patterned composite electrically conductive layer in a second region of the first patterned composite conductive layer circumscribed by a second convex polygon is at least 2, the first and second regions circumscribed by the first and second convex polygons, respectively, each comprising at least 25% of the major surface of the first patterned composite electrically conductive layer.

17. The method of claim 14, wherein a ratio of the resistance to current flow substantially parallel to the major surface of the second patterned composite electrically conductive layer in a first region of the second patterned composite electrically conductive layer circumscribed by a first convex polygon to the resistance to current flow substantially parallel to the major surface of the second patterned composite electrically conductive layer in a second region of the second patterned composite conductive layer circumscribed by a second convex polygon is at least 2, the first and second regions circumscribed by the first and second convex polygons, respectively, each comprising at least 25% of the major surface of the second patterned composite electrically conductive layer.

18. The method of claim 14, wherein the spatially varying resistance to current flow substantially parallel to a major surface of the first and second electrically conductive layers provides a uniform potential drop, or a desired non-uniform potential drop, across the area of the device.

19. The method of claim 14, wherein the first or second electrode layers are formed using a sol-gel deposition process, and wherein the first or second electrode layers comprise an electrochromic material comprising an oxide.

20. The method of claim 14, further comprising forming an organic ion conductor layer by processes employing liquid components, wherein the first electrode layer is on one side of and in contact with a first surface of the ion conductor layer, and the second electrode layer is on the other side of and in contact with a second surface of ion conductor layer.

* * * * *